(12) United States Patent
Shikaumi

(10) Patent No.: US 8,395,697 B2
(45) Date of Patent: Mar. 12, 2013

(54) IMAGING APPARATUS AND LENS UNIT

(75) Inventor: Masao Shikaumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 12/277,166

(22) Filed: Nov. 24, 2008

(65) Prior Publication Data
US 2009/0135293 A1  May 28, 2009

(30) Foreign Application Priority Data

Nov. 27, 2007  (JP) .................................. 2007-306001

(51) Int. Cl.
G03B 13/00  (2006.01)
(52) U.S. Cl. ....................................................... 348/353
(58) Field of Classification Search .................... 348/353
See application file for complete search history.

(56) References Cited

U.S. PATENT DOCUMENTS

| | | | |
|---|---|---|---|
| 5,140,357 A | | 8/1992 | Suda |
| 6,924,941 B2* | | 8/2005 | Okada et al. ................... 359/698 |
| 7,420,612 B2* | | 9/2008 | Tsujino .......................... 348/365 |
| 2003/0197803 A1* | | 10/2003 | Watanabe et al. .............. 348/345 |
| 2004/0080662 A1* | | 4/2004 | Ogino ............................ 348/345 |
| 2006/0077280 A1* | | 4/2006 | Nakahara ....................... 348/353 |
| 2008/0193115 A1* | | 8/2008 | Uenishi ......................... 396/123 |
| 2008/0199170 A1* | | 8/2008 | Shibuno et al. ............... 396/125 |

FOREIGN PATENT DOCUMENTS

| | | |
|---|---|---|
| JP | 01-218268 A | 8/1989 |
| JP | 03-188774 A | 8/1991 |
| JP | 03-247179 A | 11/1991 |
| JP | 07-248446 A | 9/1995 |
| JP | 02-821214 A | 11/1998 |
| JP | 2002-131621 A | 5/2002 |
| JP | 2007-322922 A | 12/2007 |
| JP | 2008-276131 A | 11/2008 |

* cited by examiner

*Primary Examiner* — Clayton E LaBalle
*Assistant Examiner* — Dennis Hancock
(74) *Attorney, Agent, or Firm* — Canon USA Inc IP Division

(57) ABSTRACT

An imaging apparatus includes a control unit configured to control a focus position of a lens by causing a communication unit to acquire a plurality of lens position information stored in a first storage unit without any synchronization with acquisition of an evaluation value by a contrast detection unit and associating the acquired plurality of lens position information with evaluation values stored in a second storage unit.

13 Claims, 21 Drawing Sheets

DATA STORED IN CAMERA

| ID | CONTRAST EVALUATION VALUE |
|---|---|
| 1 | E1 |
| 2 | E2 |
| 3 | E3 |
| 4 | E4 |
| 5 | E5 |
| ⋮ | ⋮ |

DATA STORED IN LENS

| ID | LENS POSITION INFORMATION |
|---|---|
| 1 | P1 |
| 2 | P2 |
| 3 | P3 |
| 4 | P4 |
| 5 | P5 |
| ⋮ | ⋮ |

DATA STORED IN CAMERA

| ID | CONTRAST EVALUATION VALUE |
|---|---|
| 1 | E1 |
| 2 | E2 |
| 3 | E3 |
| 4 | E4 |
| 5 | E5 |
| ⋮ | ⋮ |

DATA STORED IN LENS

| ID | LENS POSITION INFORMATION |
|---|---|
| 1 | P1 |
| 2 | P2 |
| 3 | P3 |
| 4 | P4 |
| 5 | P5 |
| ⋮ | ⋮ |

DATA STORED IN CAMERA
(ASSOCIATED EVALUATION VALUE AND LENS POSITION INFORMATION)

| ID | LENS POSITION INFORMATION | CONTRAST EVALUATION VALUE |
|---|---|---|
| 1 | P1 | E1 |
| 2 | P2 | E2 |
| 3 | P3 | E3 |
| 4 | P4 | E4 |
| 5 | P5 | E5 |
| ⋮ | ⋮ | ⋮ |

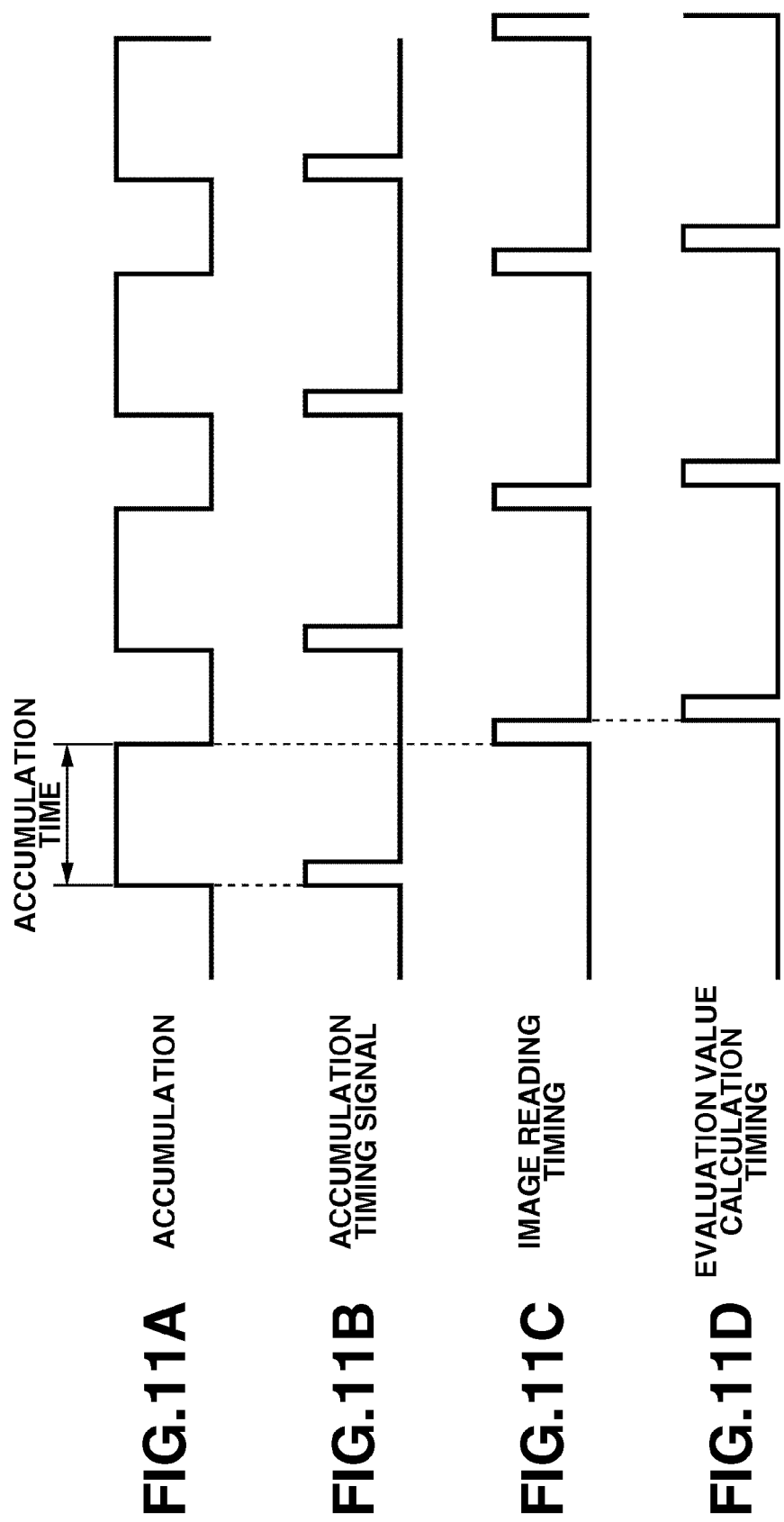

IMAGING APPARATUS AND LENS UNIT

BACKGROUND OF THE INVENTION

1. Field of the Invention

The present invention relates to a focus adjustment technique using contrast information obtained from an image sensor.

2. Description of the Related Art

In a digital camera configured to acquire digital data of an image formed by a photographic lens, auto-focus (hereinafter, referred to as "AF") control information is generally obtained from an image sensor including photoelectric conversion elements disposed in a two-dimensional pattern. This kind of image sensor is, for example, a charge coupled device (CCD) or a complementary metal oxide semiconductor (CMOS). Furthermore, automatic exposure (hereinafter, referred to as "AE") control information and white balance (hereinafter, referred to as "WB") control information are obtained from the image sensor.

A technique generally referred to as "contrast" (or "hill-climbing" or "TV-AF") method is applicable to the AF control operation. The "contrast" method includes moving a focusing lens of a photographic lens unit, or an image sensor, in the optical axis direction, then acquiring an evaluation value representing the contrast of a captured image obtained in each driving stage, and identifying a lens position where the evaluation value is maximized as an in-focus position, as discussed in Japanese Patent No. 02821214.

If the AF control operation is performed using contrast information of the entire image plane, perspective competition among a plurality of objects different in shooting distance adversely influences the AF control operation. Therefore, the contrast AF control operation is usually performed on a limited part of the image plane, which can be selected automatically or manually.

In general, a digital single-lens reflex camera includes a mirror or a shutter configured to prevent an image sensor from being irradiated with light when the image sensor is not used for an exposure operation. Accordingly, an AF sensor and an AE sensor (additional sensors dedicated to the AF and AE control operations) are installed on the digital single-lens reflex camera and configured to receive part of light entered from a photographic lens, which is guided with an optical path division mechanism.

The digital single-lens reflex cameras are recently required to perform a live view operation for displaying an image captured by an image sensor on a rear liquid crystal panel or a similar display element to enable a user to confirm the composition or a focused state. In the live view operation, a mirror rotates upward and a shutter opens to bring the image sensor into an exposure state. In this state, the AF sensor and the AE sensor cannot receive any light, and therefore the AF and AE control operations based on these dedicated sensors cannot be realized. Hence, the contrast AF and imaging plane AE control operations using the image sensor are required to perform the AF and AE control operations during the live view operation.

The contrast AF control operation performed by a single-lens reflex camera includes obtaining a contrast evaluation value while driving a lens. In this case, in addition to the obtained contrast evaluation value, information relating to a lens position where the evaluation value was acquired is required to obtain an in-focus position.

In some single-lens reflex cameras each capable of performing an AF operation, a focusing lens driving motor is installed on an interchangeable lens and a lens driving command is transmitted from a camera to the lens.

In such a single-lens reflex camera system, lens position information is acquired from a pulse encoder provided in the interchangeable lens. The camera can receive the lens position information transmitted from the lens.

As discussed in Japanese Patent Application Laid-Open No. 2002-131621, there is a phase-difference AF sensor capable of synchronizing accumulation timing of the AF sensor with lens position information.

In the contrast AF control operation, as described above, a contrast evaluation value and information relating to a lens position where the evaluation value was acquired are required to obtain an in-focus position.

The contrast evaluation value can be obtained for each image accumulated by the image sensor, i.e., for each frame. Therefore, obtaining lens position information corresponding to each frame is desired.

To perform the contrast AF control operation speedily and accurately, it is necessary to move the lens quickly or increase the number of times of acquiring the contrast evaluation value.

However, according to a system including a pulse encoder provided in a lens, lens position information obtained by the pulse encoder is transmitted to a camera using communication between the lens and the camera. Therefore, the amount of communications performed between the lens and the camera increases if the number of times of acquiring the contrast evaluation value, i.e., the frame rate in the AF operation, is increased.

SUMMARY OF THE INVENTION

Exemplary embodiments of the present invention are directed to a focus adjustment technique capable of realizing a high-speed and high-accuracy contrast AF control operation when a lens unit stores lens position information.

According to an aspect of the present invention, an imaging apparatus includes a communication unit configured to communicate with a lens unit that includes a lens driving unit configured to move a lens to change a focus position and a first memory configured to detect and store position information of the lens. The imaging apparatus further includes a contrast detection unit configured to acquire an evaluation value corresponding to a contrast of an object image based on a signal output from an image sensor according to light passing through the lens, a second memory configured to store a plurality of evaluation values acquired by the contrast detection unit at respective different timings, and a controller configured to control a focus position of the lens by causing the communication unit to acquire a plurality of lens position information stored in the first memory without any synchronization with acquisition of the evaluation value by the contrast detection unit and associating the acquired plurality of lens position information with the evaluation values stored in the second memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIGS. 11A to 11D are timing diagrams illustrating a contrast AF operation according to the first exemplary embodiment of the present invention.

DETAILED DESCRIPTION OF THE EMBODIMENTS

Figure 1:
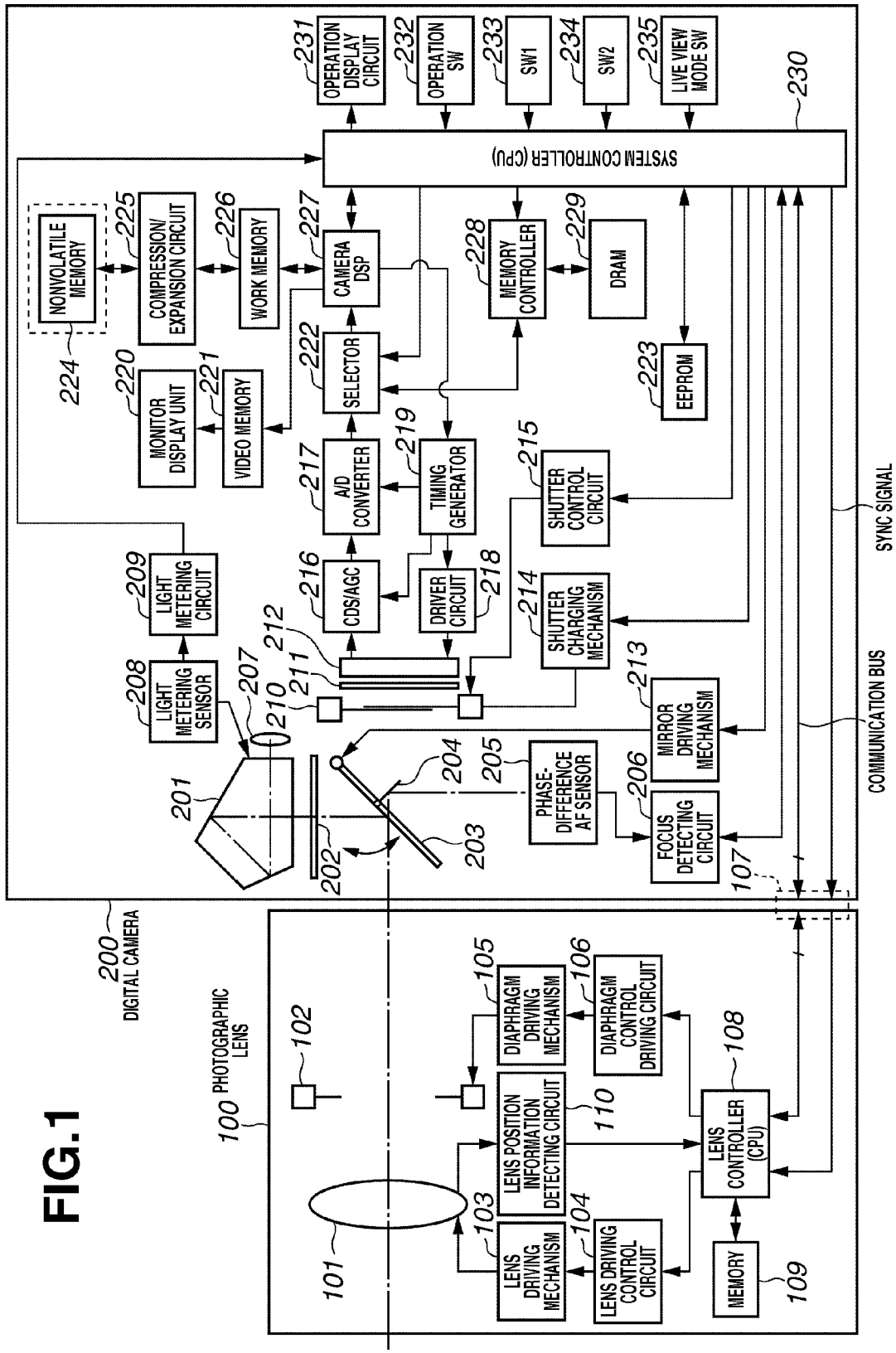
FIG. 1 is a block diagram illustrating an example arrangement of a digital camera including an automatic focusing apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 is a block diagram illustrating an example arrangement of a digital camera including an automatic focusing apparatus according to a first exemplary embodiment.

As illustrated in FIG. 1, a photographic lens 100 is detachably attached to a digital camera 200 via a lens fitting mechanism provided on a mount portion (not illustrated). An electric contact unit 107, provided on the mount portion, includes terminals for various communication bus lines, such as a communication clock line, a data transmission line, and a data reception line. The digital camera 200 and the photographic lens 100 can communicate with each other via the communication bus lines.

The digital camera 200 performs communication with the photographic lens 100 via the electric contact unit 107 to control driving operations of a focusing lens 101 and a diaphragm 102 in the photographic lens 100. The diaphragm 102 is a mechanism capable of adjusting the quantity of light. Although FIG. 1 illustrates only the focusing lens 101 as a lens provided in the photographic lens 100, a zooming lens or a stationary lens can be additionally provided to form a united lens system.

In addition to the communication bus lines, the electric contact unit 107 includes a synchronizing signal (sync signal) line via which an image accumulation timing signal is transmitted from the digital camera 200 to the photographic lens 100.

The light flux from an object (not illustrated) is guided to a quick return mirror 203 of the digital camera 200 via a lens unit including the focusing lens 101 and the diaphragm 102 provided in the photographic lens 100. The quick return mirror 203 is disposed across a photographic optical path and is inclined relative to an optical axis. The quick return mirror 203 can swing between a first position (the position illustrated in FIG. 1) where the light flux from an object is guided to a finder optical system positioned above the quick return mirror 203 and a second position where the quick return mirror 203 retreats from the photographic optical path.

The quick return mirror 203 has a central portion configured as a half mirror. When the quick return mirror 203 is lowered down to the first position, part of the light flux from an object passes through the half mirror of the quick return mirror 203. Then, the light flux is reflected by a sub mirror 204 provided on the rear side of the quick return mirror 203. Then, the reflected light flux is guided to a phase-difference AF sensor 205. The phase-difference AF sensor 205 and a focus detecting circuit 206 function cooperatively as an automatic-focus adjustment unit.

The focus detecting circuit 206 performs detection of a focusing state of the photographic lens 100 (focus detection) based on a signal output from the phase-difference AF sensor 205. The light flux reflected by the quick return mirror 203 reaches a photographer's eye via the finder optical system. The finder optical system includes a finder screen 202 positioned on a focal plane, a pentagonal prism 201, and an eyepiece lens 207.

If the quick return mirror 203 is raised up to the second position, the light flux from the photographic lens 100 reaches an image sensor 212 via a focal plane shutter 210 (i.e., a mechanical shutter) and an optical filter 211. The optical filter 211 is capable of cutting infrared light and guiding visible light to the image sensor 212. The optical filter 211 can also function as an optical low-pass filter.

The focal plane shutter 210 includes a first curtain and a second curtain, which cooperatively control transmission/blocking of the light flux from the photographic lens 100.

If the quick return mirror 203 is raised up to the second position, the sub mirror 204 rotates toward the quick return mirror 203 and retreats from the photographic optical path.

The quick return mirror 203 is raised up to the second position not only in a still image shooting operation but also in a live view operation.

The digital camera 200 includes a system controller 230 performing various control operations for the digital camera. The system controller 230 includes a central processing unit (CPU) or a micro-processing unit (MPU), which controls various operations performed in below-described circuits.

The system controller 230 communicates with a lens controller 108 of the photographic lens 100 via the communication bus lines and the electric contact unit 107.

Similar to the system controller 230, the lens controller 108 includes a CPU or a MPU, which controls an operation performed in each circuit in the photographic lens 100.

Communications performed between the system controller 230 and the lens controller 108 include transmission of a driving command, a stop command, and a driving amount of the focusing lens 101 of the photographic lens 100, a driving amount of the diaphragm 102, and a request of various data to be transmitted from the photographic lens 100, which are transmitted from the system controller 230 to the lens controller 108. The lens controller 108 transmits status information indicating driving states of the focusing lens 101 and the diaphragm 102, and various parameters of the photographic lens 100 including an open F-number, and a focal length.

In the focus control, the system controller 230 transmits commands indicating a lens driving direction and a driving amount to the lens controller 108.

If the lens controller 108 receives a lens driving command from the system controller 230, the lens controller 108 causes a lens driving control circuit 104 to control a lens driving mechanism 103. The lens driving mechanism 103 includes a driving source, such as a stepping motor or a DC motor, which can drive the focusing lens 101 in the optical axis direction to perform a focus adjusting operation.

If the lens controller 108 receives a diaphragm driving command from the system controller 230, the lens controller 108 causes a diaphragm control driving circuit 106 to control a diaphragm driving mechanism 105. The diaphragm driving mechanism 105 drives the diaphragm 102 to a position corresponding to a command value.

The system controller 230 is connected to the shutter control circuit 215 and the light metering circuit 209. The shutter control circuit 215 controls driving of the first and second curtains of the focal plane shutter 210 according to a signal supplied from the system controller 230.

The system controller 230 transmits a lens driving command to the lens controller 108, which controls the lens driving mechanism 103 via the lens driving control circuit 104 in such a manner that a focused object image can be formed on the image sensor 212.

A camera digital signal processor (DSP) 227 includes a built-in circuit block capable of calculating a contrast value for a contrast AF operation. A detailed arrangement of the contrast value calculation circuit block is described below.

The camera DSP 227 is directly connected to the timing generator 219, the video memory 221, and the work memory 226. Furthermore, the camera DSP 227 is connected to an analog/digital (A/D) converter 217 via a selector 222.

The image sensor 212 is driven by an output of a driver circuit 218, which performs horizontal driving and vertical driving of each pixel according to a signal supplied from the timing generator 219 that determines overall driving timing. The image sensor 212 outputs an image signal.

An output of the A/D converter 217 is supplied to a memory controller 228 via the selector 222, which selects a signal based on a signal supplied from the system controller 230. The memory controller 228 transfers all the data received from the A/D converter 217 to a dynamic random access memory (DRAM) 229. The DRAM 229 is a frame memory.

In a video or a compact digital camera in a pre-shooting state, the result is periodically (for each frame) transferred to the video memory 221 to cause a monitor display unit 220 to perform finder display (live view display). In a single-lens reflex digital camera, the quick return mirror 203 or the focal plane shutter 210 prevents the image sensor 212 from being irradiated with light in the pre-shooting state. Therefore, the live view display cannot be usually performed.

In this case, the live view operation is feasible if the quick return mirror 203 moves upward (i.e., retreats from a photographic optical path) and the focal plane shutter 210 is kept in an opened state. Furthermore, the camera DSP 227 or the system controller 230 can obtain a contrast evaluation value by processing an image signal obtained from the image sensor 212 during the live view operation. Then, the contrast AF control operation can be performed based on the evaluation value.

In a shooting operation, the camera DSP 227 performs image processing on pixel data of one frame read out from the DRAM 229 according to a control signal supplied from the system controller 230, and temporarily stores the processed data in the work memory 226. Then, the compression/expansion circuit 225 compresses the data stored in the work memory 226 according to a predetermined compression format. The compression/expansion circuit 225 stores the compressed data in an external nonvolatile memory (external memory) 224. For example, the external nonvolatile memory 224 is a flash memory or a comparable nonvolatile memory, or can be a hard disk or a magnetic disk.

An operation display circuit 231, connected to the system controller 230, includes display elements such as liquid crystal elements, light emitting diodes (LEDs), or organic electroluminescence (EL) elements, which can display an operation state of the camera set or selected by a user via the above-described switches. An operation SW 232 enables a user to operate various functions of the camera.

A release switch SW1 233 enables a user to start a shooting preparation operation including a light metering/focus detection area. A release switch SW2 234 enables a user to start a shooting operation (an operation for accumulating electric charge and reading the accumulated electric charge to acquire a still image).

In the photographic lens 100 serving as a lens unit, the lens controller 108 includes a memory 109. The memory 109 stores performance information (e.g., focal length and open F-number of the photographic lens 100), lens identification (ID) information (i.e., unique information for identifying the photographic lens 100), and information received from the system controller 230.

Although described below in more detail, lens position information is latched in response to an accumulation timing signal supplied via the sync signal line while the contrast AF is operating. The latched lens position information can be stored in the memory 109.

The performance information and the lens ID information are transmitted to the system controller 230 during the initial communication performed when the photographic lens 100 is attached to the digital camera 200. The system controller 230 stores the performance information and the lens ID information in an electrically erasable and programmable read only memory (EEPROM) 223.

The photographic lens 100 includes a lens position information detecting circuit 110 to obtain position information of the focusing lens 101. The lens controller 108 can read the lens position information detected by the lens position information detecting circuit 110. The lens controller 108 can perform control for driving the focusing lens 101 based on the readout lens position information, or can transmit the lens position information to the system controller 230 via the electric contact unit 107.

For example, the lens position information detecting circuit 110 includes a pulse encoder capable of detecting the number of rotation pulses of a motor constituting the lens driving mechanism 103. An output of the lens position information detecting circuit 110 is entered to a hardware counter (not illustrated) provided in the lens controller 108. When the focusing lens 101 is driven, lens position information is counted by the hardware counter. When the lens controller 108 obtains the lens position information, the lens controller 108 accesses a register of the hardware counter and reads out a count value stored in the register.

Figure 2:
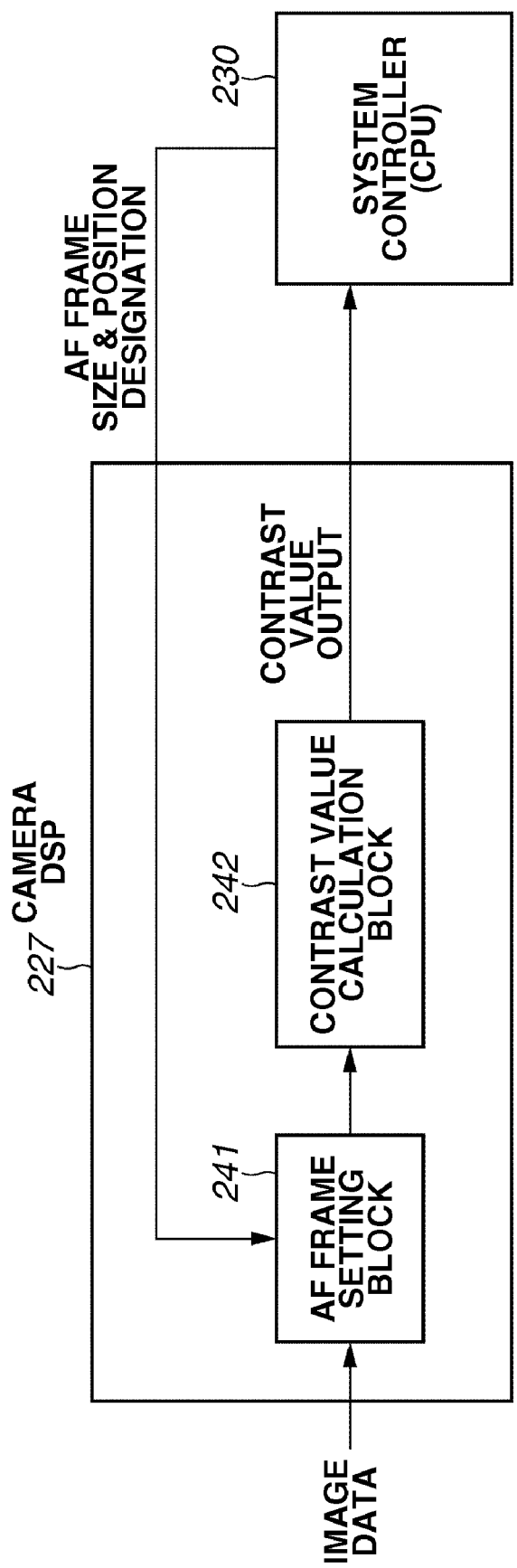
FIG. 2 is a block diagram illustrating a contrast value calculation circuit block according to the first exemplary embodiment of the present invention.

FIG. 2 is a block diagram illustrating the contrast value calculation circuit block in the camera DSP 227.

A correlated double sampling/automatic gain control (CDS/AGC) circuit 216 amplifies an electric image signal entered from the image sensor 212. The A/D converter 217 converts an output signal of the CDS/AGC circuit 216 into a digital signal. The camera DSP 227 receives digitized image data via the selector 222.

The camera DSP 227 includes an AF frame setting block 241, which calculates a contrast value for contrast detection based on image data entered from the selector 222. The AF frame setting block 241 functions as a unit configured to set an AF frame for trimming a limited image region including a main object from full-screen image data and to send the trimmed image to a contrast value calculation block 242.

It is desired to set the AF frame having a size equivalent to 1/5 to 1/10 of the outer frame of the image plane in the length direction. The system controller 230 can control the AF frame setting block 241 to set a desired position of the AF frame in the image plane and sizes in the vertical and horizontal directions.

Figure 3:
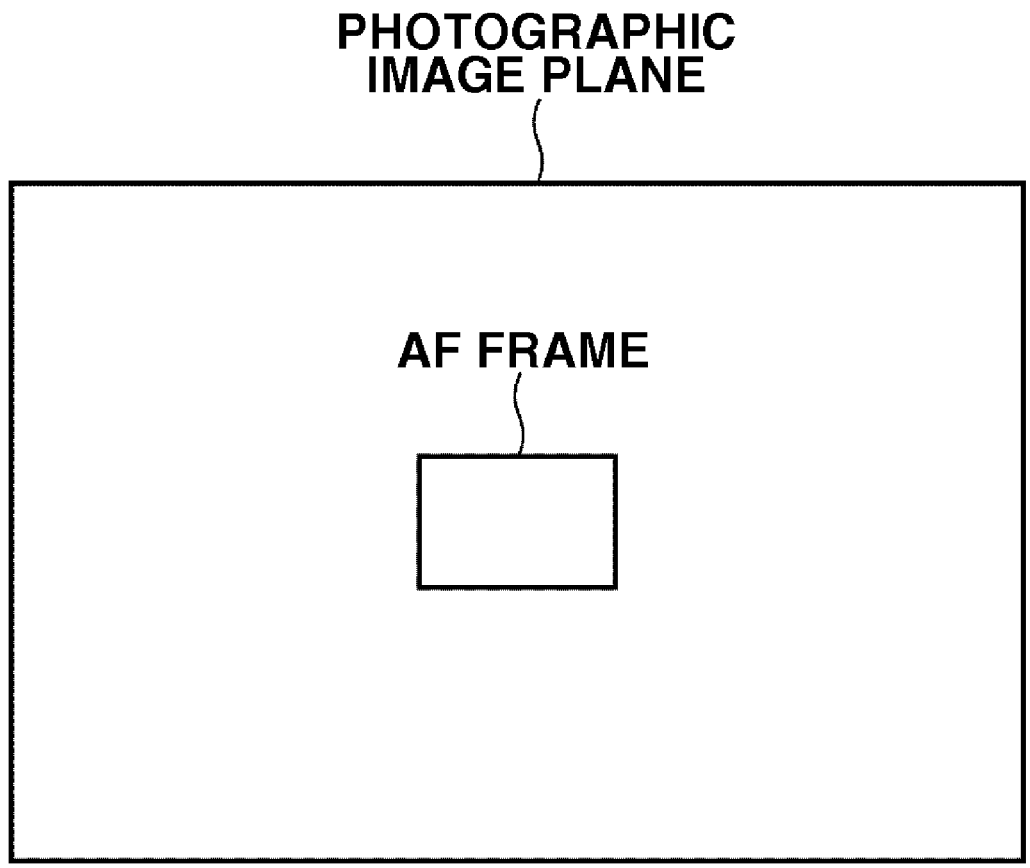
FIG. 3 illustrates an AF frame according to the first exemplary embodiment of the present invention.

FIG. 3 illustrates an example AF frame displayed at the center of a photographic image plane, in which the AF frame has a size equivalent to 1/5 of the frame length of the image plane.

Figure 4:
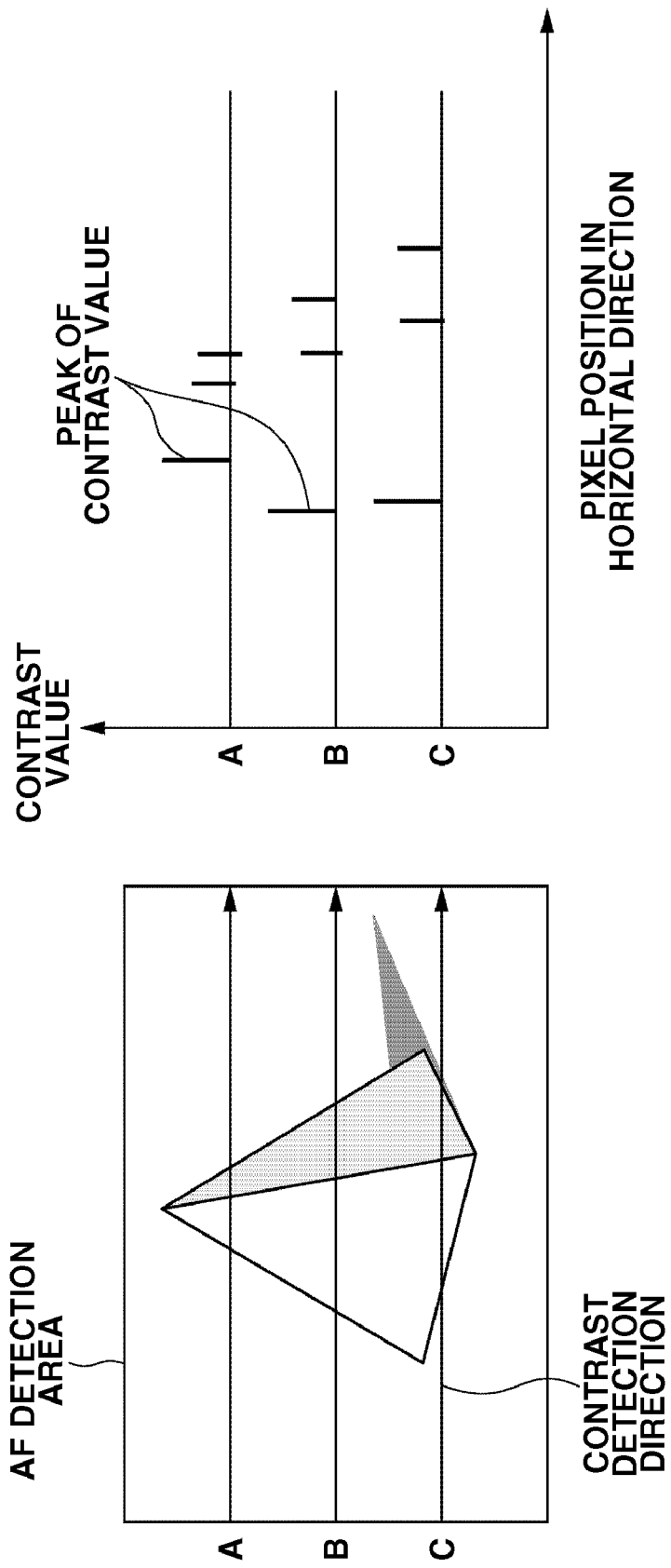
FIG. 4 illustrates a contrast evaluation method according to the first exemplary embodiment of the present invention.

FIG. 4 illustrates an example contrast evaluation method, according to which a triangular pyramid is captured in an AF area corresponding to the AF frame. Contrast values corresponding to horizontal lines A, B, and C are illustrated on the right side of FIG. 4. In this manner, peak values of the contrast in each line can be obtained and a contrast evaluation value in the AF frame can be obtained by integrating the peak values in the vertical direction.

The contrast AF control operation according to an exemplary embodiment is simply described with reference to FIG. 5.

The contrast AF control operation is a technique capable of automatically adjusting the focus of a video camera or a compact digital camera, according to which a high-frequency component of a video signal obtained from an image sensor (e.g., CCD or CMOS) is extracted as a focus signal. Then, a focusing lens in an imaging optical system is moved to an in-focus position where the focus signal serving as a contrast evaluation value (in-focus evaluation value) can be maximized.

This control method is generally referred to as "hill-climbing method" or "TV-AF method", which can accurately perform focus adjustment regardless of an object distance without using any special optical member dedicated to the focus adjustment.

Figure 5:
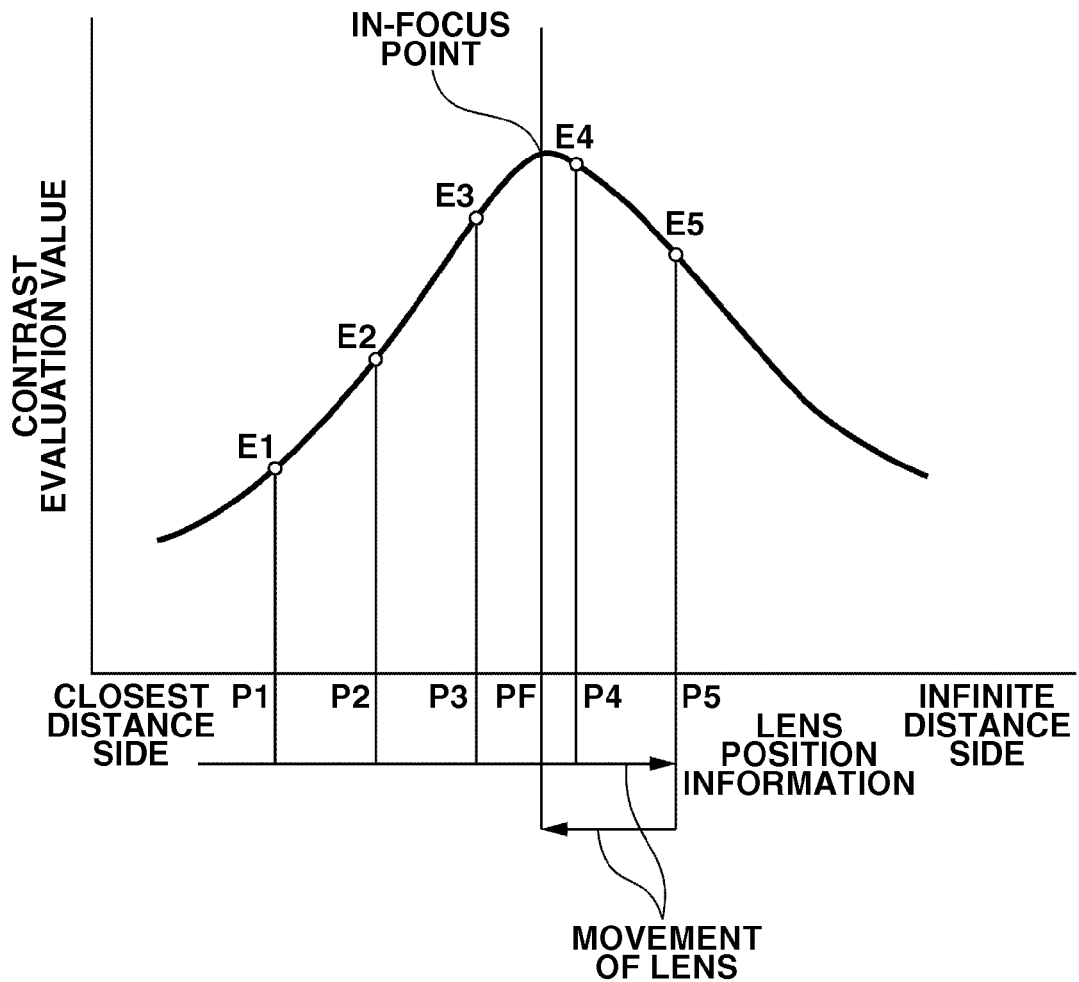
FIG. 5 is a graph illustrating example focus detection in a contrast AF control operation according to the first exemplary embodiment of the present invention.

FIG. 5 illustrates an example method for detecting an in-focus point in the contrast AF control operation. The value on the abscissa axis represents the position of a focusing lens. The value on the ordinary axis represents a contrast evaluation value.

The method includes acquiring contrast evaluation values while moving the focusing lens in both directions indicated by arrows in FIG. 5, and storing lens position information corresponding to the acquiring timing of the acquired evaluation values.

The method further includes continuously moving the focusing lens in the same direction if the contrast evaluation value keeps increasing (as indicted by points E1 to E4 illustrated in FIG. 5), and stopping the focusing lens if the contrast evaluation value starts decreasing (as indicted by point E5 in FIG. 5) because the focusing lens has passed over the in-focus position.

Then, the method includes performing a focusing operation, which includes calculating lens position information of the in-focus point based on an interpolation using the acquired plurality of lens position data and contrast evaluation values, and driving the focusing lens to the calculated position (position PF illustrated in FIG. 5).

For example, the interpolation includes obtaining approximated equations of cubic polynomial expression based on four points (E2 to E5) near the in-focus point and calculating a maximum position of the approximated equations. A position where a differential value (gradient) of the approximated equation becomes 0 can be obtained as a maximum position.

Figure 6:
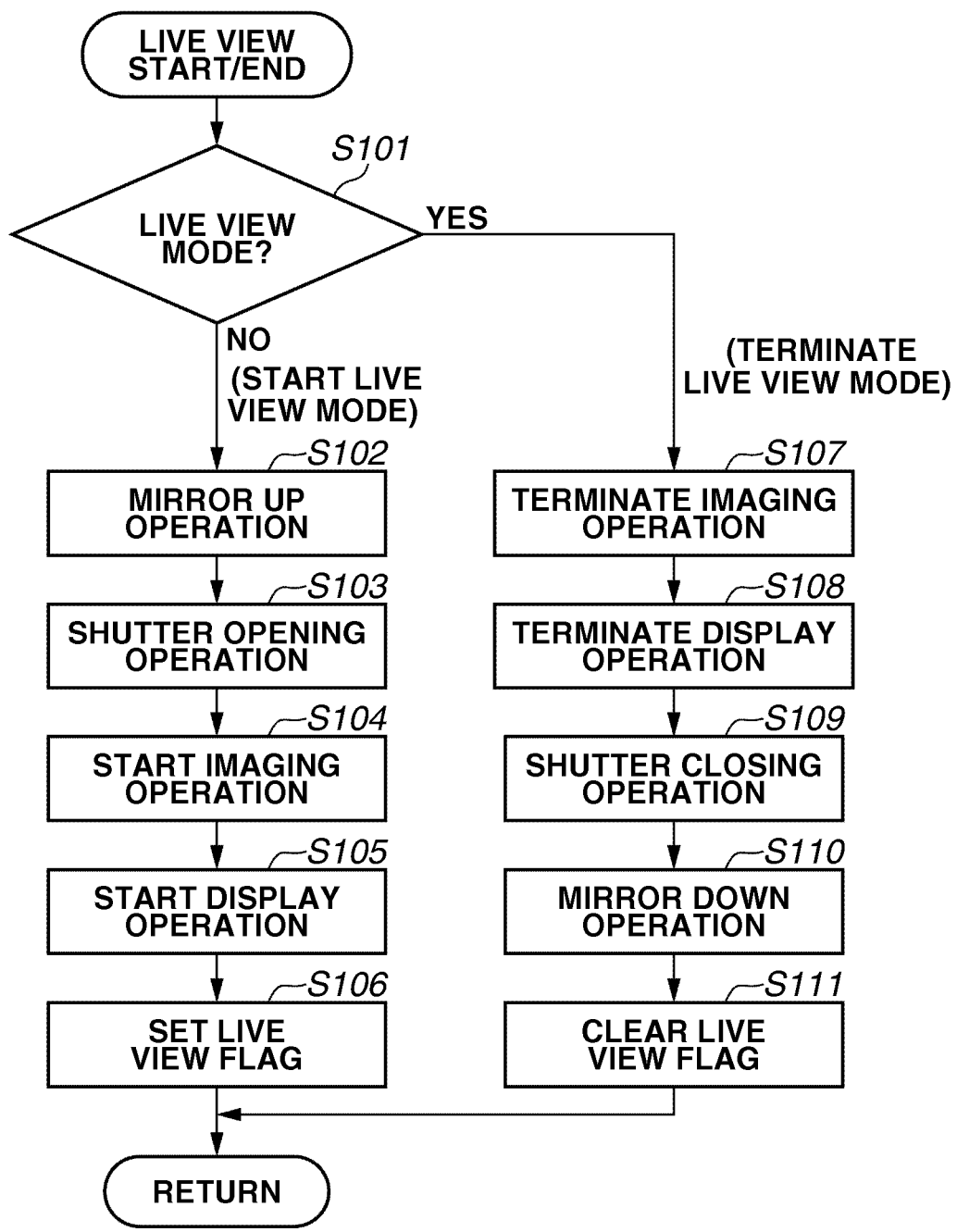
FIG. 6 is a flowchart illustrating a live view start/end sequence according to the first exemplary embodiment of the present invention.

Example operations according to an exemplary embodiment are described below. FIG. 6 is a flowchart illustrating a live view start/end sequence according to an exemplary embodiment, which is executed by the system controller 230 based on a computer-executable program.

In an exemplary embodiment, the imaging system starts or terminates a live view operation when a user operates a live view mode SW 235. The imaging system executes the sequence when the live view mode SW 235 is operated.

If the live view mode SW 235 is operated, the processing proceeds to step S101, in which the system controller 230 determines whether the live view mode is currently set referring to a live view flag stored in a random access memory (RAM) of the system controller 230. If the live view mode is not currently set (NO in step S101), the processing proceeds to step S102, in which the system controller 230 performs live view mode start (activation) processing.

In step S102, the system controller 230 sends a command to a mirror driving mechanism 213 to raise the quick return mirror 203 up to a shooting position. The sub mirror 204, which is linked with the upward movement of the quick return mirror 203, reaches a standby position for a shooting operation.

Then, the processing proceeds to step S103, in which the system controller 230 sends a command to the shutter control circuit 215 to open the focal plane shutter 210, which is charged by a shutter charging mechanism 214.

Then, the processing proceeds to step S104, in which the system controller 230 starts an imaging operation using the camera DSP 227, the selector 222, the timing generator 219, the driver 218, the CDS/AGC circuit 216, and the A/D converter 217. The imaging operation includes accumulating the image sensor 212 according to a predetermined accumulation time and reading image information. In this case, the system controller 230 performs image information reading processing by appropriately thinning the image data according to a predetermined display rate determined for the live view mode. The read image information is stored in the DRAM 229 via the memory controller 228.

Then, the processing proceeds to step S105, in which the system controller 230 causes the camera DSP 227 to perform white balance processing, gamma processing, and color conversion on the image information stored in the DRAM 229. Then, the camera DSP 227 causes, via the video memory 221, the monitor display unit 220 to perform captured image display.

The above-described imaging and display operations are continuously repeated during the live view mode.

In step S106, the system controller 230 sets the live view flag stored in the RAM to indicate that the live view mode is in progress. Then, the system controller 230 terminates the live view mode start processing.

On the other hand, if the live view mode is currently set (YES in step S101), the processing proceeds to step S107, in which the system controller 230 performs live view mode end (termination) processing.

In step S107, the system controller 230 terminates the imaging operation (i.e., terminates the processing for accumulating the image sensor 212 and reading image information).

Then, the processing proceeds to step S108, in which the system controller 230 stops updating image data to be displayed on the monitor display unit 220 and turns off an illumination for the monitor display unit 220 to terminate the live view display operation.

In step S109, the system controller 230 sends a command to the shutter control circuit 215 to close the focal plane shutter 210.

In step S110, the system controller 230 sends a command to the mirror driving mechanism 213 to lower the quick return mirror 203 down to an ordinary (home) position.

In step S111, the system controller 230 clears the live view flag stored in the RAM to indicate termination of the live view mode. Then, the system controller 230 terminates the live view mode end processing.

Figure 7:
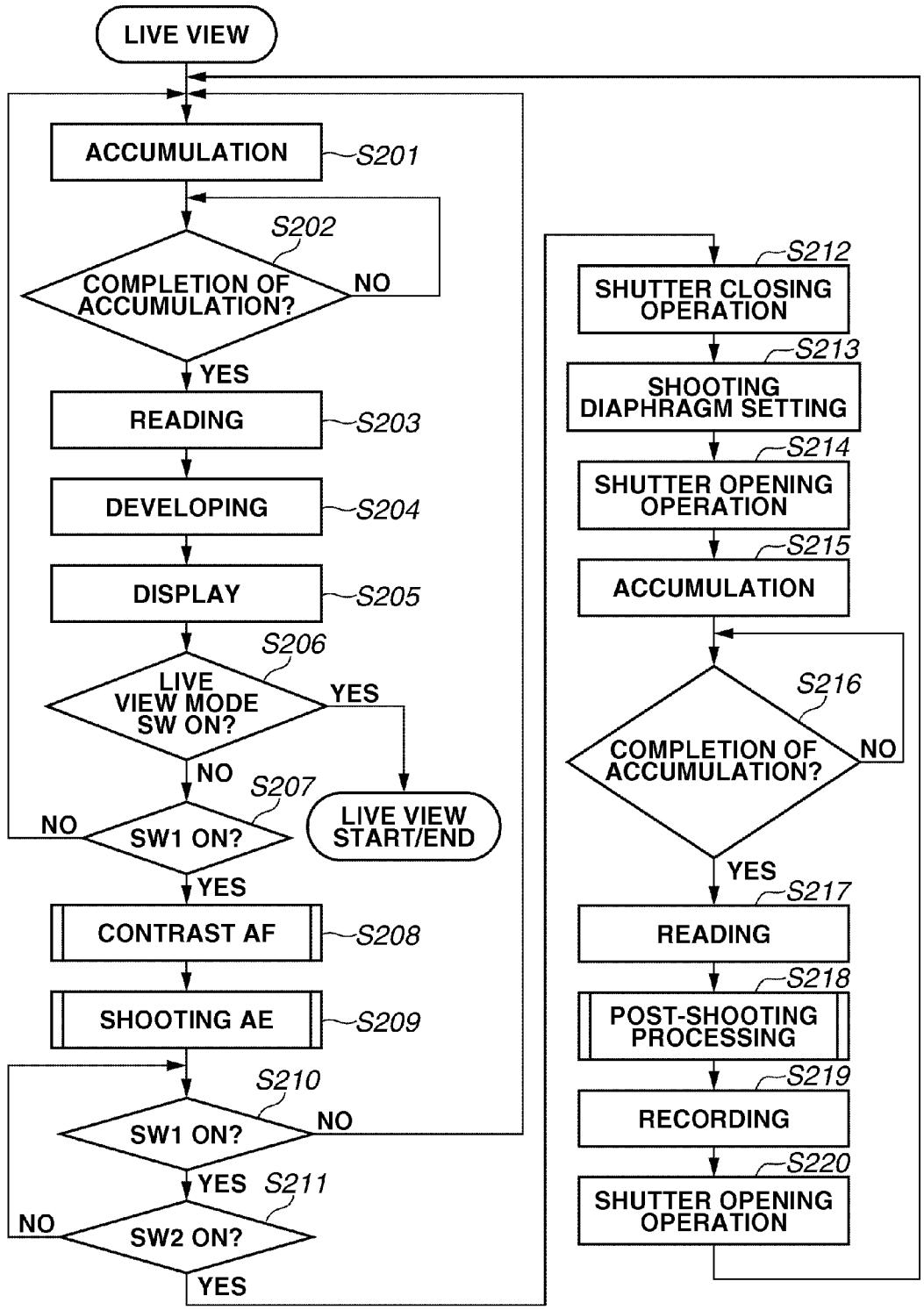
FIG. 7 is a flowchart illustrating an example sequence of a live view operation, performed when a release switch SW1 is pressed to start a shooting operation, according to the first exemplary embodiment of the present invention.

FIG. 7 is a flowchart illustrating an example sequence in which the release switch SW1 is pressed during the live view operation to start a shooting operation.

In step S201, the system controller 230 performs an operation for accumulating the image sensor 212.

In step S202, the system controller 230 determines whether the accumulation operation has been completed. If the accumulation operation is not yet completed (NO in step S202), the system controller 230 repeats the processing of step S202. If the accumulation operation has been completed (YES in step S202), the processing proceeds to step S203.

In step S203, the system controller 230 reads image information from the image sensor 212 in an area required for live view display and stores the read image information in the DRAM 229. More specifically, the system controller 230 sends a command to the camera DSP 227 to drive the timing generator 219 to read image information using the driver 218, the CDS/AGC circuit 216, the A/D converter 217, the selector 222, and the memory controller 228.

In this case, the frame rate of the live view display can be increased by increasing the reading speed. To this end, a hardware device can be used to obtain an average of image information of two to three neighboring pixels of the same color on the image sensor 212. Furthermore, it is effective to perform the reading operation by appropriately thinning out image information in vertical and horizontal directions.

In step S204, the system controller 230 causes the camera DSP 227 to perform developing processing (including white balance, gamma processing, and color conversion) on the image information stored in the DRAM 229.

In step S205, the system controller 230 sends the developed image data to the monitor display unit 220 via the video memory 221. The monitor display unit 220 performs display of a live view image based on the developed image data.

In step S206, the system controller 230 determines whether the live view mode SW 235 is in an ON state. If the live view mode SW 235 is in an ON state (YES in step S206), the processing proceeds to the live view start/end processing illustrated in FIG. 6. The system controller 230 terminates the live view mode processing. If the live view mode SW 235 is in an OFF state (NO in step S206), the processing proceeds to step S207.

In step S207, the system controller 230 checks the state of the release switch SW1 233. If the release switch SW1 233 is in an ON state (YES in step S207), the processing proceeds to step S208. If the release switch SW1 233 is in an OFF state (NO in step S207), the processing returns to step S201. The system controller 230 repeats the live view display operation.

In step S208, the system controller 230 performs the above-described contrast AF control operation, according to which the camera DSP 227 and the system controller 230 calculate a contrast evaluation value while causing the focusing lens 101 to move slightly. The system controller 230 completes AF processing by stopping the focusing lens 101 at a position where the calculated contrast evaluation value can be maximized. An example detailed contrast AF operation is described below.

Then, the processing proceeds to step S209, in which the system controller 230 performs a shooting AE operation to determine the amount of exposure in a shooting operation. In an ordinary shooting operation, according to which the live view operation is not required, the light metering sensor 208 provided in the finder optical system can be used for the shooting AE operation. In the live view operation, the quick return mirror 203 rotates upward and no light flux enters the finder optical system. Therefore, a shooting exposure amount can be determined based on image information obtained by the image sensor 212.

Then, the processing proceeds to step S210, in which the system controller 230 checks the state of the release switch SW1 233. If the release switch SW1 233 is in an OFF state (NO in step S210), the processing returns to step S201. Namely, the system controller 230 stops the sequence performed when the release switch SW1 233 is ON and resumes the live view operation in step S201. If the release switch SW1 233 is in an ON state (YES in step S210), the processing proceeds to step S211.

In step S211, the system controller 230 checks the state of the release switch SW2 234. If the release switch SW2 234 is in an ON state (YES in step S211), the processing proceeds to step S212 to start a shooting sequence. If the release switch SW2 234 is in an OFF state (NO in step S211), the system controller 230 repeats the processing of steps S210 and S211.

When the processing proceeds to step S212, the system controller 230 performs the following shooting sequence. In step S212, the system controller 230 causes the shutter control circuit 215 to close the shutter 210 as the shutter 210 is in an open state for the live view operation.

Then, the processing proceeds to step S213, in which the system controller 230 transmits a diaphragm driving command corresponding to an aperture value determined in the shooting AE operation (step S209) to the lens controller 108 via the electric contact unit 107.

If the lens controller 108 receives the diaphragm driving command, the lens controller 108 causes the diaphragm control driving circuit 106 to control the diaphragm driving mechanism 105 to drive the diaphragm 102 to a position corresponding to a commanded value.

In step S214, the system controller 230 sends a command to the shutter control circuit 215 to open the focal plane shutter 210 charged by the shutter charging mechanism 214.

In step S215, the system controller 230 performs an operation for accumulating the image sensor 212.

In step S216, the system controller 230 determines whether a time corresponding to a shutter speed determined in the shooting AE operation (step S209) has elapsed. If the time corresponding to the shutter speed has elapsed, the system controller 230 causes the shutter control circuit 215 to close the focal plane shutter 210.

In step S217, the system controller 230 reads image information from the image sensor 212 and stores the read image information in the DRAM 229. To this end, the system controller 230 sends a command to the camera DSP 227, which drives the timing generator 219 to use the driver 218, the CDS/AGC circuit 216, the A/D converter 217, the selector 222, and the memory controller 228.

In step S218, the system controller 230 records the formed image in the work memory 226. The system controller 230 causes the camera DSP 227 to perform sequential post-shooting processing on image information stored in the DRAM 229. The post-shooting processing includes white balance processing, gamma processing, color conversion, JPEG conversion, thumbnail creation, and captured image display on the monitor display unit 220 via the video memory 221.

In step S219, the system controller 230 causes the compression/expansion circuit 225 to perform compression processing on the image data formed by the post-shooting processing in step S219 and stored in the work memory 226. The system controller 230 records the compressed image data in the nonvolatile memory 224.

Then, the processing proceeds to step S220, in which the system controller 230 sends a command to the shutter control circuit 215 to open the focal plane shutter 210 charged by the shutter charging mechanism 214. Then, the processing returns to step S201 to resume the live view operation.

Next, example operations in the contrast AF control operation are described below with reference to FIGS. 8 and 9.

Figure 8:
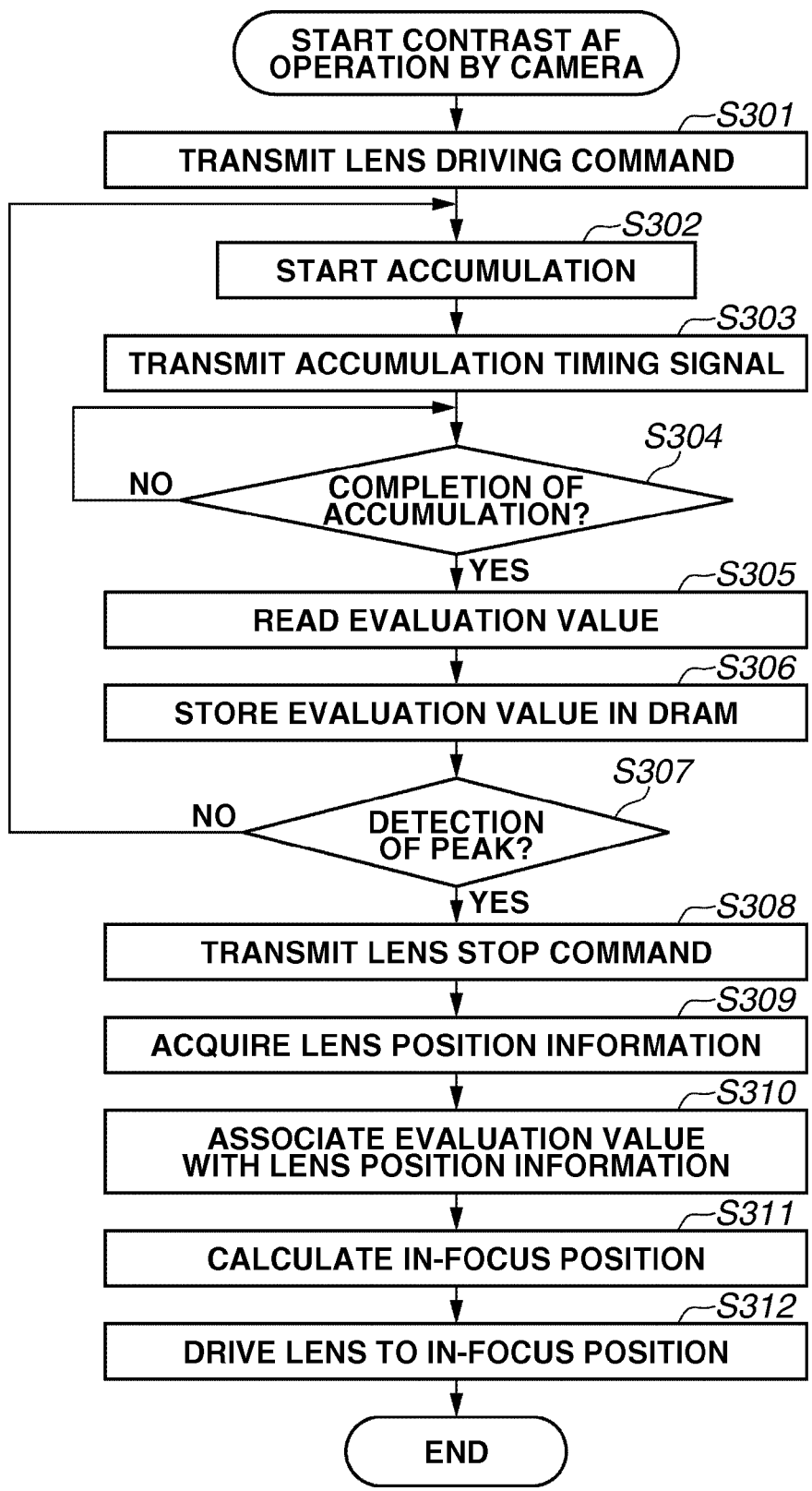
FIG. 8 is a flowchart illustrating an example operation performed by a system controller in the contrast AF control operation according to the first exemplary embodiment of the present invention.

FIG. 8 is a flowchart illustrating an example operation performed by the system controller 230 in the contrast AF control operation.

When the system controller 230 starts the contrast AF control operation, the processing proceeds to step S301, in which the system controller 230 transmits a lens driving command for the contrast AF control operation to the lens controller 108 via the electric contact unit 107. At this moment, the in-focus position (i.e., target position) is unknown. Therefore, the system controller 230 transmits a command to drive the focusing lens 101 in a designated direction, not a command to drive the focusing lens 101 by a predetermined amount.

When the lens controller 108 receives the command, the lens controller 108 causes the lens driving mechanism 103 via the lens driving control circuit 104 to continuously move the focusing lens 101 until a stop command is received or the focusing lens 101 reaches a drive end.

In step S302, the system controller 230 starts an operation for accumulating the image sensor 212.

Then, the processing proceeds to step S303, in which the system controller 230 transmits an accumulation timing signal for capturing an object image to the lens controller 108 via the sync signal line provided in the electric contact unit 107.

In step S304, the system controller 230 determines whether a predetermined accumulation time has elapsed. The accumulation time can be determined beforehand according to a light metering operation during the live view operation.

After completing the accumulation of electric charge for the object image, the system controller 230 performs image reading, developing, and display operations as described in the sequential live view operation in FIG. 7.

The contrast AF control operation includes transmitting the read image data to the AF frame setting block 241 and the contrast value calculation block 242 provided in the camera DSP 227 (see FIG. 2), calculating a contrast value (evaluation value) described with reference to FIG. 4, and transmitting the calculated evaluation value to the system controller 230.

In step S305, the system controller 230 reads the transmitted evaluation value. In step S306, the system controller 230 stores the read evaluation value in the DRAM 229 to associate each evaluation value with lens position information transmitted later from the photographic lens 100.

In step S307, the system controller 230 checks the presence of any peak in the evaluation value. For example, the system controller 230 can detect a peak by determining whether the evaluation value starts decreasing after reaching a maximum value.

If there is not any peak (NO in step S307), the processing returns to step S302. The system controller 230 repeats the above-described processing.

FIGS. 11A to 11D are timing diagrams illustrating accumulation of an object image, the accumulation timing signal, image reading timing, and evaluation value calculation timing in the above-described operation.

FIG. 11A illustrates the accumulation time of an object image, in which high level (level H) indicates accumulation in progress and a change from level H to low level (level L) indicates termination of the accumulation.

FIG. 11B illustrates the accumulation timing signal transmitted to the photographic lens 100 in step S303, in which the accumulation timing signal changes from level L to level H at start timing of the accumulation illustrated in FIG. 11A. The photographic lens 100 latches lens position information in response to a rising edge of the accumulation timing signal as described below.

FIG. 11C illustrates the image reading timing, in which level H indicates reading of image in progress. The reading of image starts in response to completion of the accumulation illustrated in FIG. 11A.

FIG. 11D illustrates the evaluation value calculation timing at which the system controller 230 reads an evaluation value. The contrast value calculation block 242 in the camera DSP 227 has a hardware arrangement configured to perform calculation upon reading an image. Calculation of a contrast value terminates at the timing the reading of an image is completed (timing H→L in FIG. 11C). The system controller 230 reads an evaluation value (timing L→H in FIG. 11D).

If a peak of the evaluation value is detected (YES in step S307), the processing proceeds to step S308. In step S308, the system controller 230 transmits a lens stop command to the lens controller 108 via the electric contact unit 107.

Then, the processing proceeds to step S309. As described below, the photographic lens 100 stores lens position information in the memory 109 in synchronization with the accumulation timing signal (which triggers accumulation of electric charge for an object image). When the focusing lens 101 is stopped, the photographic lens 100 transmits the lens position information stored in the memory 109 to the system controller 230. The system controller 230 acquires the lens position information via the electric contact unit 107.

The system controller 230 transmits a request command to acquire the lens position information. In response to the request command, the lens controller 108 transmits the lens position information. Alternatively, the lens controller 108 can transmit the lens position information in response to the lens stop command generated in step S308.

Then, the processing proceeds to step S310, in which the system controller 230 associates the evaluation value stored in the DRAM 229 with the lens position information acquired from the photographic lens 100 in step S309, as a set of data obtained almost simultaneously.

In step S311, the system controller 230 calculates a lens position corresponding to the in-focus position. The system controller 230 calculates a peak position of the evaluation value using interpolation processing, and obtains a lens position corresponding to the peak position of the evaluation value with reference to the relationship between the evaluation value and the lens position information associated with each other in step S310.

In step S312, the system controller 230 transmits a command to the lens controller 108 via the electric contact unit 107. The lens controller 108 causes the lens driving mechanism 103 via the lens driving control circuit 104 to move the focusing lens 101 to the calculated lens position corresponding to the in-focus position.

Then, the system controller 230 terminates the contrast AF control operation for the digital camera 200.

Figure 9:
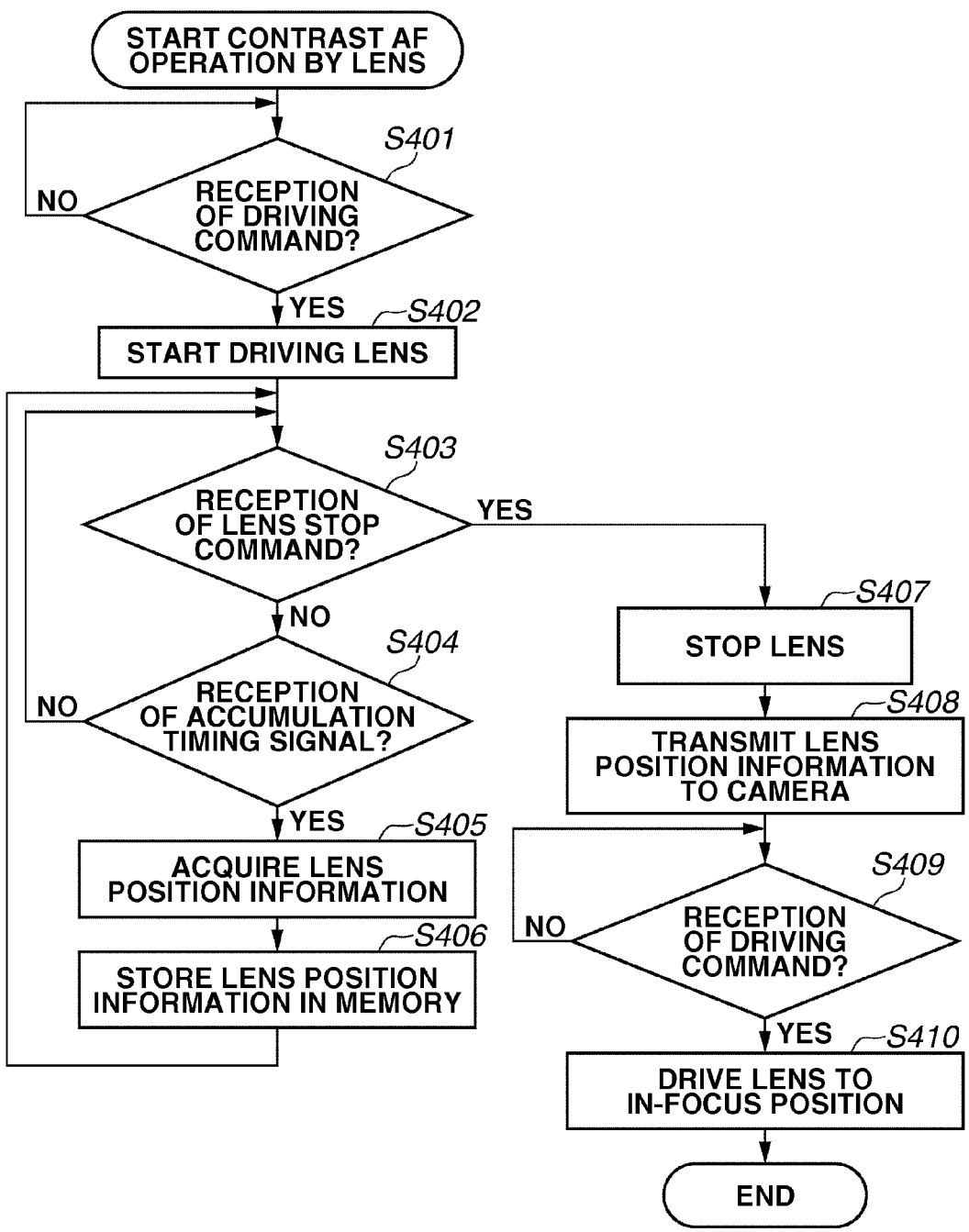
FIG. 9 is a flowchart illustrating an example operation performed by a lens controller in the contrast AF control operation according to the first exemplary embodiment of the present invention.

FIG. 9 is a flowchart illustrating an example operation performed by the lens controller 108 of the photographic lens 100 in the contrast AF control operation.

When the contrast AF control operation starts, the processing proceeds to step S401, in which the lens controller 108 waits for a lens driving command to be transmitted from the system controller 230 via the electric contact unit 107 as described in step S301.

If the lens driving command is received (YES in step S401), the processing proceeds to step S402. In step S402, the lens controller 108 drives the lens driving mechanism 103 via the lens driving control circuit 104. The lens driving mechanism 103 moves the focusing lens 101 to adjust the focus position.

In step S403, the lens controller 108 determines whether a lens stop command is received from the digital camera 200. If the lens stop command is not received (NO in step S403), the processing proceeds to step S404.

In step S404, the lens controller 108 checks the sync signal terminal provided in the electric contact unit 107 to determine whether the accumulation timing signal transmitted from the digital camera 200 in the step S303 has risen.

If a rising in the accumulation timing signal is not detected (NO in step S404), the processing returns to step S403. The lens controller 108 continuously repeats the loop processing of steps S403 and S404 to detect reception of a lens stop command or a rising in the accumulation timing signal.

If a rising in the accumulation timing signal is detected (YES in step S404), the processing proceeds to step S405.

In step S405, the lens controller 108 acquires position information of the focusing lens 101 via the lens position information detecting circuit 110.

Then, the processing proceeds to step S406, in which the lens controller 108 stores the acquired lens position information in the memory 109. Then, the processing returns to step S403.

If the lens stop command is received (YES in step S403), the processing proceeds to step S407.

In step S407, the lens controller 108 controls the lens driving control circuit 104 to cause the lens driving mechanism 103 to stop the movement of the focusing lens 101. For example, the lens driving mechanism 103 performs braking energization or stops electric power supply.

When the movement of the focusing lens 101 is stopped, the processing proceeds to step S408. The lens controller 108 transmits the lens position information stored in the memory 109 to the system controller 230 of the digital camera 200 via the electric contact unit 107. The system controller 230 transmits a request command to acquire the lens position information. In response to the request command, the lens controller 108 returns the lens position information. Alternatively, the lens controller 108 can transmit the lens position information in response to the lens stop command generated in step S308.

Then, the processing proceeds to step S409, in which the lens controller 108 waits for a lens driving command.

As described above, when the system controller 230 completes calculation of a lens position corresponding to the in-focus position, the system controller 230 transmits a lens driving command obtained in step S312 to the lens controller 108. If the lens controller 108 receives the lens driving command (YES in step S409), the processing proceeds to step S410.

In step S410, the lens controller 108 controls the lens driving control circuit 104 to cause the lens driving mechanism 103 to move the focusing lens 101 to a designated position according to the received lens driving command. Thus, the focusing lens 101 reaches the in-focus position.

Then, the lens controller 108 terminates the contrast AF operation for the photographic lens 100.

Figures 10A, 10B, 10C:
FIGS. 10A to 10C illustrate an example storage state of contrast evaluation values and lens position information according to the first exemplary embodiment of the present invention.

FIGS. 10A to 10C illustrate an example storage state of contrast evaluation values and lens position information associated with each other.

FIG. 10A illustrates contrast evaluation values obtained in step S306 and stored in the digital camera 200.

The system controller 230 sequentially stores obtained contrast evaluation values in the DRAM 229 and allocates an ID number to each contrast evaluation value, so as to be associated with lens position information. The system controller 230 successively increments the ID number (e.g., 1, 2, ... ) after starting the focusing operation to sequentially storing contrast evaluation values (E1, E2, ... ) in the DRAM 229 while associating the contrast evaluation values with the allocated ID numbers.

FIG. 10B illustrates lens position information obtained in step S406 and stored in the photographic lens 100.

The lens controller 108 acquires lens position information from the lens position information detecting circuit 110 in response to the accumulation timing signal transmitted from the digital camera 200. The lens controller 108 sequentially stores obtained lens position information in the memory 109 and allocates an ID number to information of each lens position.

The lens controller 108 successively increments the ID number (e.g., 1, 2, ... ) after starting the focusing operation to sequentially storing lens position information (P1, P2, ... ) in the memory 109 while associating the lens position information with the allocated ID numbers. The lens controller 108 performs the above-described accumulation processing for each AF frame or for a specific AF frame if such a frame is designated.

After the focusing lens 101 is stopped, the lens controller 108 transmits the stored lens position information (see FIG. 10B) to the digital camera 200. The system controller 230 receives the lens position information from the photographic lens 100 (step S309). Then, the system controller 230 stores the received lens position information in the DRAM 229 while associating it with the contrast evaluation value having the same ID number.

FIG. 10C illustrates the contrast evaluation values associated with the lens position information stored in the DRAM 229 of the digital camera 200 (step S310). The system controller 230 performs interpolation processing for calculating an in-focus position using the information relating to a lens position near a peak of the contrast evaluation value indicating an in-focus point (step S311). The system controller 230 performs the above-described processing for calculating the in-focus position for each AF frame or for a specific AF frame if such a frame is designated.

As described above, when the focusing lens 101 is moving in the contrast AF control operation, the photographic lens 100 does not perform communication with the digital camera 200 to transmit lens position information. When the focusing lens 101 is moving, the photographic lens 100 stores lens position information in the memory 109 while associating it with accumulation timing information transmitted from the digital camera 200.

Thus, acquisition timing of an evaluation value stored in the digital camera 200 can be synchronized with the lens position information stored in the photographic lens 100. Then, after stopping the focusing lens 101, the lens controller 108 transmits the lens position information to the system controller 230 of the digital camera 100. In other words, when the lens controller 108 is not busy (i.e., when the lens controller 108 does not need to perform acceleration/deceleration control), the lens controller 108 transmits the lens position information to the system controller 230.

Regarding the processing performed by the lens controller 108, lens position information can be read by reading a count value of a built-in hardware counter. Therefore, the processing load in reading lens position information is lower than the processing load in communicating with the digital camera 200.

If it is determined that the processing load of the lens controller 108 is heavy (e.g., when the lens controller 108 is currently performing lens acceleration/deceleration processing), the lens controller 108 temporarily stores lens position information in the memory 109. Then, if it is determined that the processing load of the lens controller 108 is not heavy (e.g., when the focusing lens 101 is stopped and the lens controller 108 does not need to perform the lens acceleration/deceleration processing), the lens controller 108 transmits the stored lens position information to the digital camera 200. Thus, an exemplary embodiment can provide an automatic focusing apparatus capable of realizing high-speed and high-accuracy processing without adversely influencing the lens driving processing performed by a photographic lens, even when the number of times in acquiring the contrast evaluation value is increased.

According to another exemplary embodiment, the digital camera 200 can transmit the accumulation timing signal in response to completion of the accumulation.

According to the above-described first exemplary embodiment, the digital camera 200 transmits an accumulation timing signal to the photographic lens 100 via the sync signal line to accumulate electric charge for an object image.

A second exemplary embodiment is different from the first exemplary embodiment in that another method is used to synchronize the acquisition timing of a contrast evaluation value and the acquisition timing of lens position information.

In general, the interval of the image accumulation timing is kept to be constant in the contrast AF control operation. Therefore, a predetermined accumulation period for an object image is set beforehand in the photographic lens 100. When the photographic lens 100 starts a lens driving operation, the digital camera 200 transmits a trigger signal synchronized with accumulation of an object image to the photographic lens 100.

Then, the photographic lens 100 acquires lens position information at intervals corresponding to the predetermined image accumulation period. Therefore, the digital camera 200 can acquire a contrast evaluation value and the photographic lens 100 can acquire lens position information at the same timing, although they are not directly synchronized with each other.

An imaging system according to the second exemplary embodiment is described with reference to FIGS. 12 to 14.

In the following description, blocks and steps functionally similar to those described in the first exemplary embodiment are denoted using the same reference numbers.

Figure 12:
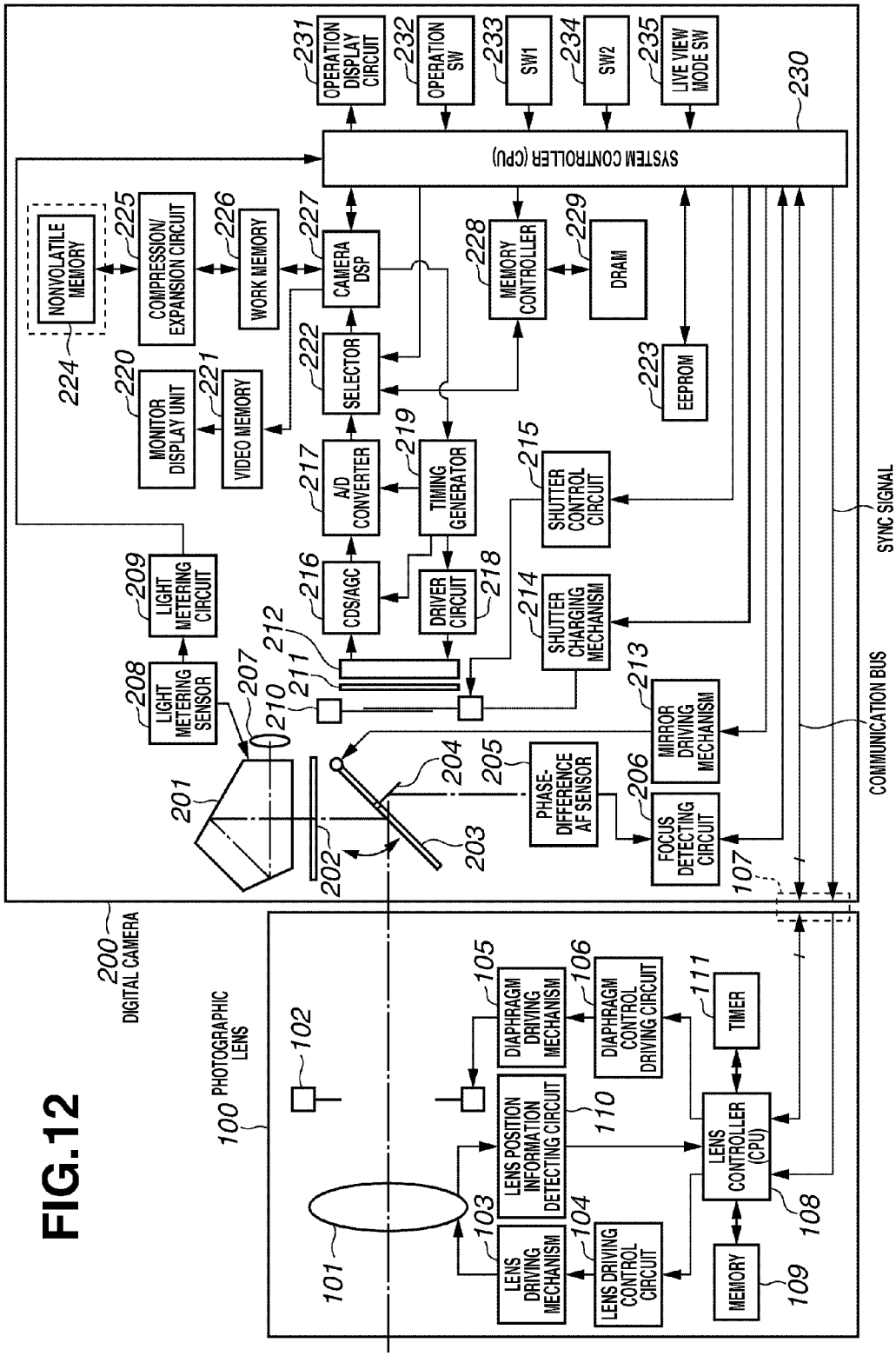
FIG. 12 is a block diagram illustrating an example arrangement of a digital camera including an automatic focusing apparatus according to a second exemplary embodiment of the present invention.

FIG. 12 is a block diagram illustrating an example arrangement of a digital camera including an automatic focusing apparatus according to the second exemplary embodiment.

The imaging system illustrated in FIG. 12 is different from the imaging system illustrated in FIG. 1 in that the sync signal line serves as a trigger signal line transmitting an AF start timing signal to the photographic lens 100 to start a contrast AF control operation. The photographic lens 100 includes a timer 111, which sends a timing signal to the lens controller 108 at every preset time.

Example operations in the contrast AF control operation according to the second exemplary embodiment are described below with reference to FIGS. 13 and 14.

Figure 13:
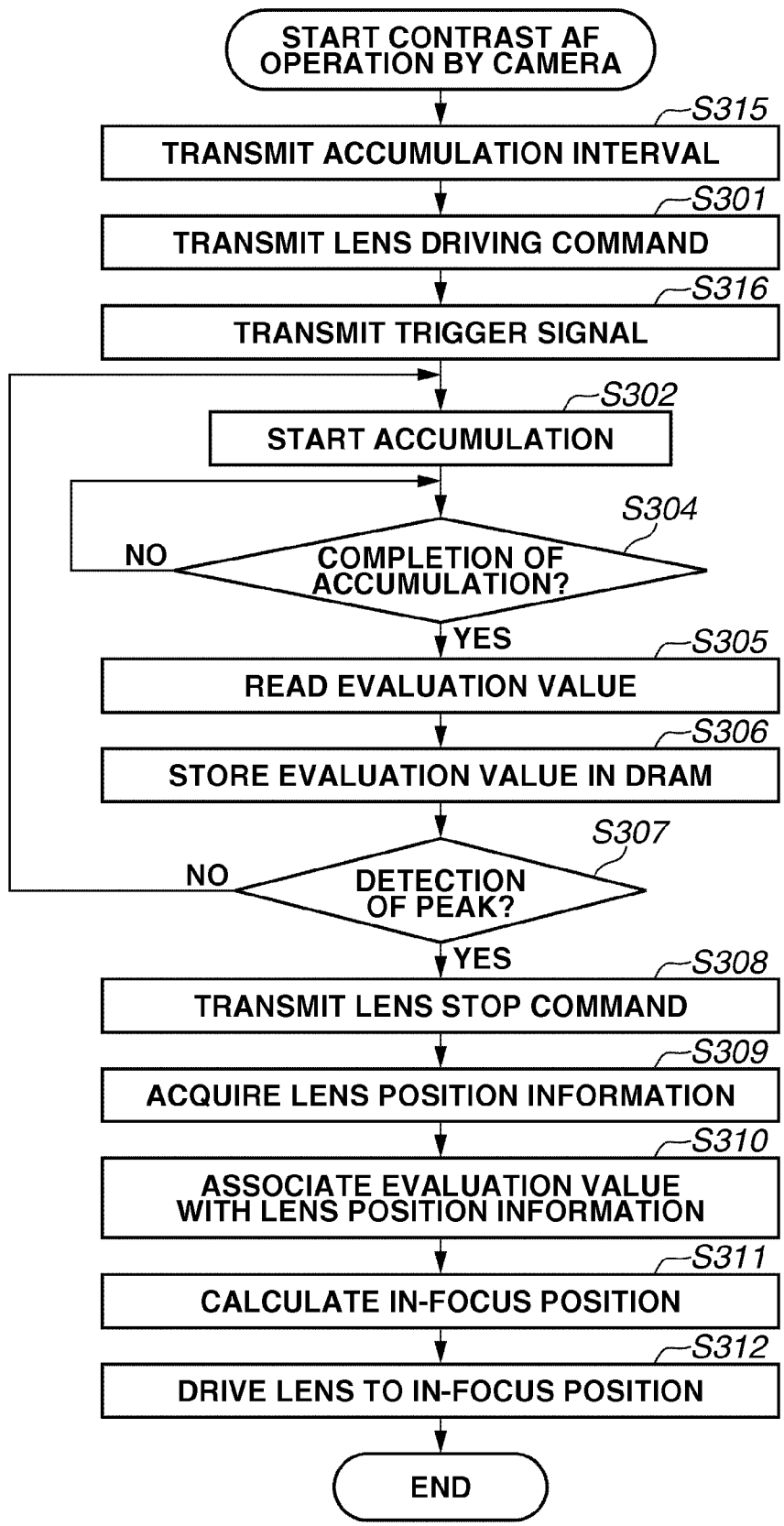
FIG. 13 is a flowchart illustrating an example operation performed by a system controller in the contrast AF control operation according to the second exemplary embodiment of the present invention.

FIG. 13 is a flowchart illustrating an example operation performed by the system controller 230 of the digital camera 200 in the contrast AF control operation according to the second exemplary embodiment, which corresponds to the operation described in the first exemplary embodiment with reference to FIG. 8.

When the contrast AF control operation starts, the processing proceeds to step S315, in which the system controller 230 transmits a predetermined accumulation interval to the photographic lens 100 via the communication terminal provided in the electric contact unit 107. For example, if the frame rate is 30 frames per second, the system controller 230 transmits a value corresponding to 33.3 msec. or a value representing 30 frames per second.

In step S301, the system controller 230 transmits a lens driving command. Then, the system controller 230 transmits a trigger signal to the photographic lens 100 via a trigger signal terminal provided in the electric contact unit 107.

Then, the system controller 230 performs sequential operations similar to those described in the first exemplary embodiment (see FIG. 8).

Figure 14:
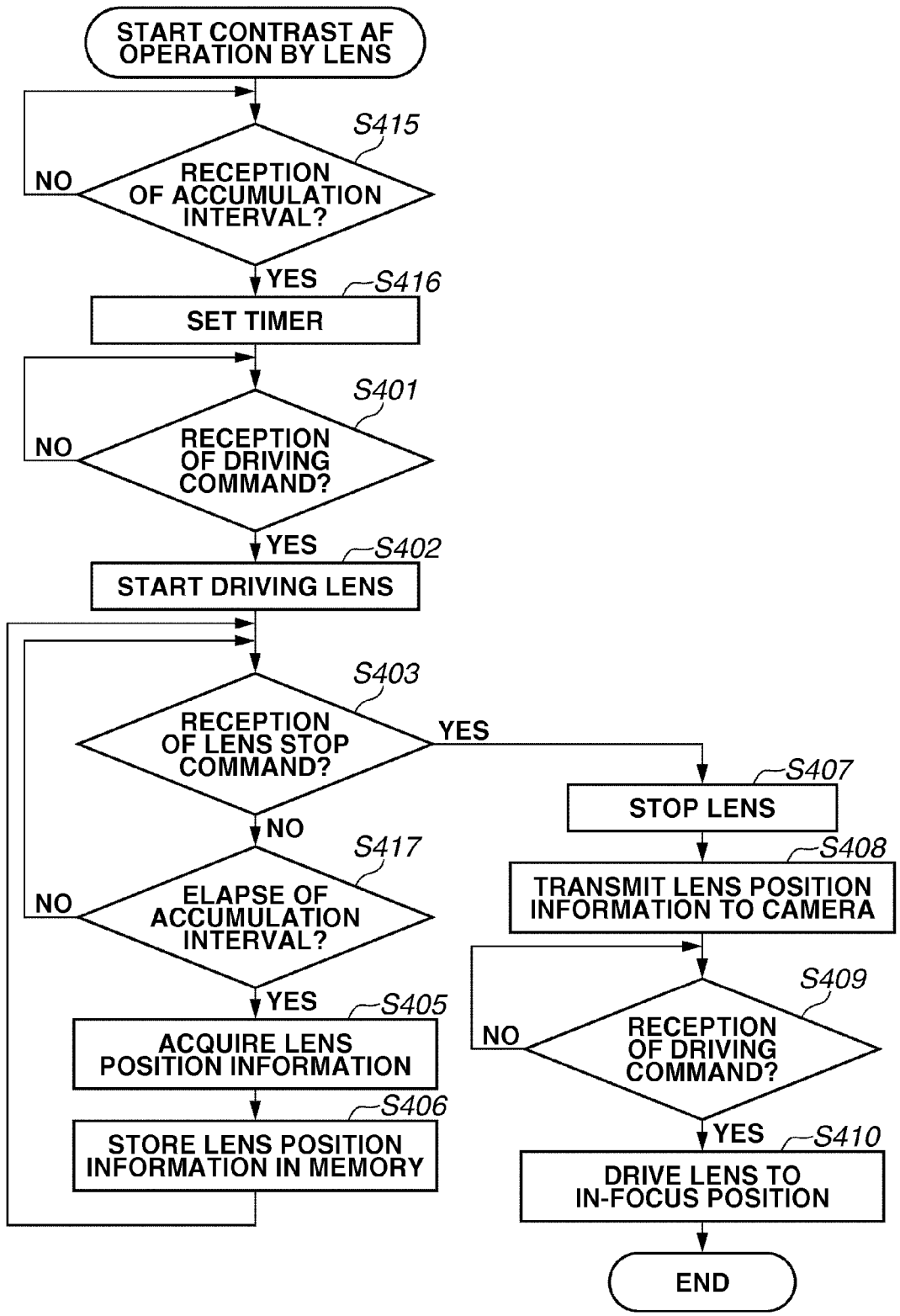
FIG. 14 is a flowchart illustrating an example operation performed by a lens controller in the contrast AF control operation according to the second exemplary embodiment of the present invention.

FIG. 14 is a flowchart illustrating an example operation performed by the lens controller 108 of the photographic lens 100 in the contrast AF control operation according to the second exemplary embodiment, which corresponds to the operation described in the first exemplary embodiment with reference to FIG. 9.

When the contrast AF control operation starts, the processing proceeds to step 415, in which the lens controller 108 waits for the accumulation interval to be transmitted from the digital camera 200.

If the accumulation interval is received from the digital camera 200 (YES in step S415), the processing proceeds to step S416. In step S416, the lens controller 108 sets the timer 111 connected to the lens controller 108 to generate a timing signal at the received accumulation interval. In step S401, the lens controller 108 waits for the lens driving command to be transmitted from the digital camera 200.

Then, the lens controller 108 performs sequential operations similar to those described in the first exemplary embodiment (see FIG. 9) although step S404 is replaced with step S417. In step S417, the lens controller 108 determines whether the accumulation interval set by the timer 111 has elapsed.

As described above, according to the second exemplary embodiment, the digital camera 200 is not configured to transmit an accumulation timing signal in response to acquisition of a contrast evaluation value. Therefore, the photographic lens 100 is not required to wait for the accumulation timing signal to be transmitted from the digital camera 200 or to perform interrupt processing.

Therefore, the processing load of the photographic lens 100 can be decreased in an acceleration/deceleration operation. The timing (accumulation interval) given from the timer 111 to the lens controller 108 can be designated through initial communication with the system controller 230 performed when the photographic lens 100 is attached to the digital camera 200 or when a power source of the digital camera 200 is turned on.

According to the first and second exemplary embodiments, the photographic lens 100 transmits all of the lens position information stored in the contrast AF control operation to the digital camera 200 when the focusing lens 101 is stopped.

However, actually required information is information relating to a lens position near the in-focus point, i.e., a peak of the contrast evaluation value. Thus, unlike the first and second exemplary embodiments, a third exemplary embodiment selects information relating to a lens position near the in-focus point.

A block diagram according to the third exemplary embodiment is similar to the block diagram of the first exemplary embodiment illustrated in FIG. 1.

Figure 15:
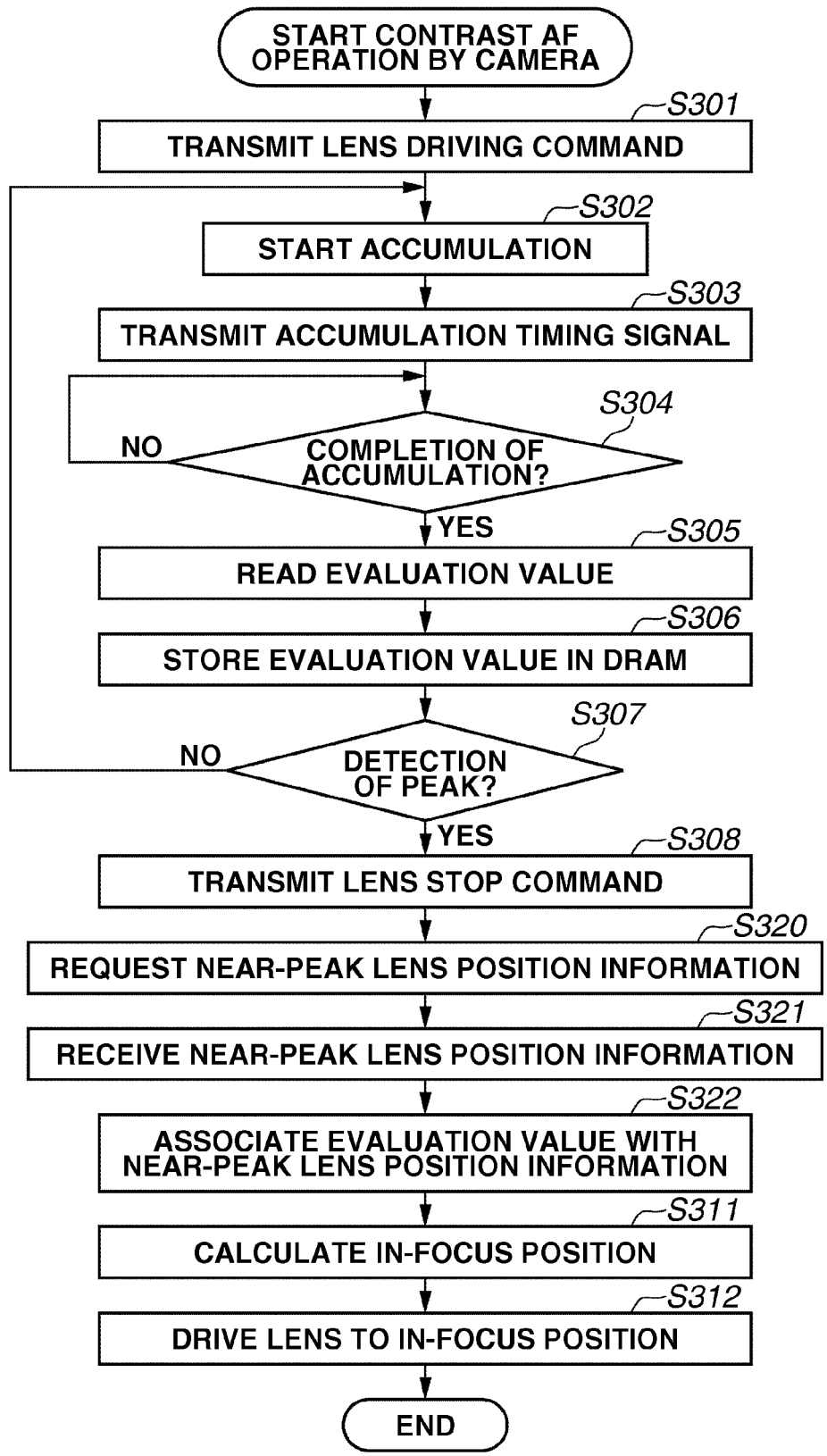
FIG. 15 is a flowchart illustrating an example operation performed by a system controller in the contrast AF control operation according to a third exemplary embodiment of the present invention.

Example operations in the contrast AF control operation according to the third exemplary embodiment are described below with reference to FIGS. 15 and 16. FIG. 15 is a flowchart illustrating an example operation performed by the system controller 230 of the digital camera 200 in the contrast AF control operation according to the third exemplary embodiment, which corresponds to the operation described in the first exemplary embodiment with reference to FIG. 8.

In the third exemplary embodiment, the system controller 230 performs sequential operations similar to those described in the first exemplary embodiment (see FIG. 8) from step S307 (check the presence of any peak) to step S308 (transmit a lens stop command).

Then, the processing proceeds to step S320, in which the system controller 230 requests the photographic lens 100 to transmit information relating to a lens position near the detected peak. For example, the system controller 230 designates an ID number representing the lens position near the detected peak.

The system controller 230 requests calculation data for an interpolation. For example, the system controller 230 requests information relating to four lens positions near the peak to perform an interpolation using cubic equations. Then, the processing proceeds to step S321, in which the system controller 230 receives requested lens position information from the photographic lens 100.

Then, the processing proceeds to step S322, in which the system controller 230 associates the stored contrast evaluation value with the received lens position information. Then, the system controller 230 performs operations similar to those described in the first exemplary embodiment (see FIG. 8). Namely, in step S311, the system controller 230 calculates an in-focus position.

In step S312, the system controller 230 causes the lens driving mechanism 103 to drive the focusing lens 101 to the in-focus position. Then, the system controller 230 terminates the contrast AF control operation for the digital camera 200. An example operation performed by the photographic lens 100 is described below.

Figure 16:
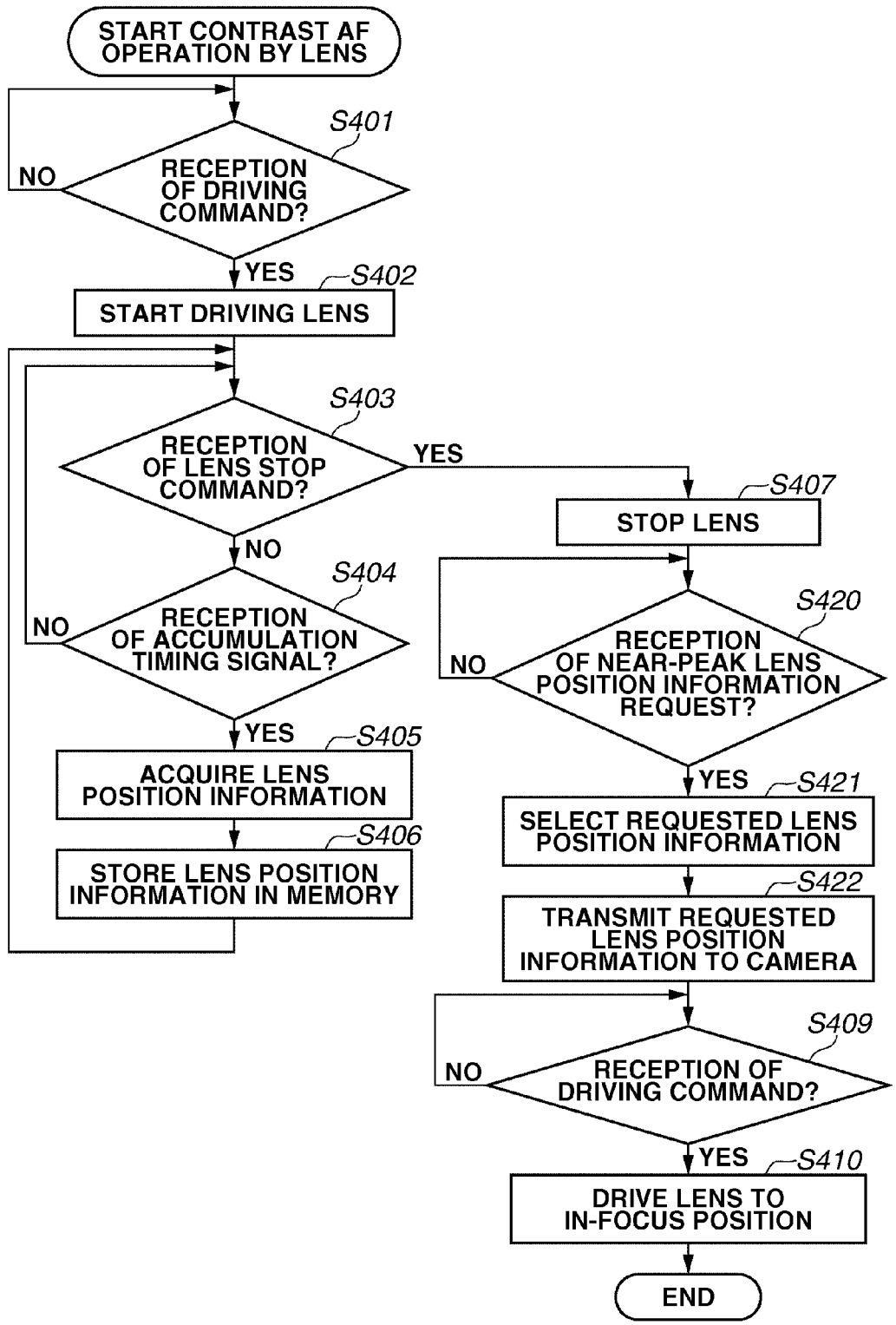
FIG. 16 is a flowchart illustrating an example operation performed by a lens controller in the contrast AF control operation according to the third exemplary embodiment of the present invention.

FIG. 16 is a flowchart illustrating an example operation performed by the lens controller 108 of the photographic lens 100 in the contrast AF control operation according to the third exemplary embodiment, which corresponds to the operation described in the first exemplary embodiment with reference to FIG. 9. The lens controller 108 performs sequential operations similar to those described in the first exemplary embodiment (see FIG. 9) to stop the focusing lens 101 (step S407).

Then, the processing proceeds to step S420, in which the lens controller 108 waits for a near-peak lens position information request to be transmitted from the digital camera 200. If the near-peak lens position information request is received (YES in step S420), the processing proceeds to step S421. In step S421, the lens controller 108 selects requested position information from the lens position information stored in the memory 109.

In step S422, the lens controller 108 transmits the selected lens position information to the digital camera 200.

In step S409, the lens controller 108 waits for the lens driving command to be transmitted from the digital camera 200. If the lens driving command is received (YES in step S409), the processing proceeds to step S410. In step S410, the lens controller 108 causes the lens driving mechanism 103 to drive the focusing lens 101 to the in-focus position. Then, the lens controller 108 terminates the contrast AF control operation for the photographic lens 100.

As described above, the third exemplary embodiment can reduce the amount of communications because only the information relating to a lens position near the in-focus point is transmitted.

According to the first to third exemplary embodiments, the photographic lens 100 transmits lens position information to the digital camera 200 after detecting a peak position and stopping the focusing lens 101. The digital camera 200 calculates an in-focus position based on the lens position information received from the photographic lens 100. A fourth exemplary embodiment is different from the first to third exemplary embodiments in that the digital camera 200 transmits contrast evaluation value information to the photographic lens 100 after the focusing lens 101 is stopped and the photographic lens 100 performs a focusing operation by calculating an in-focus position and driving the focusing lens 101 to the calculated position.

A block diagram according to the fourth exemplary embodiment is similar to the block diagram of the first exemplary embodiment illustrated in FIG. 1. Example operations in the contrast AF control operation according to the fourth exemplary embodiment are described below with reference to FIGS. 17 and 18.

Figure 17:
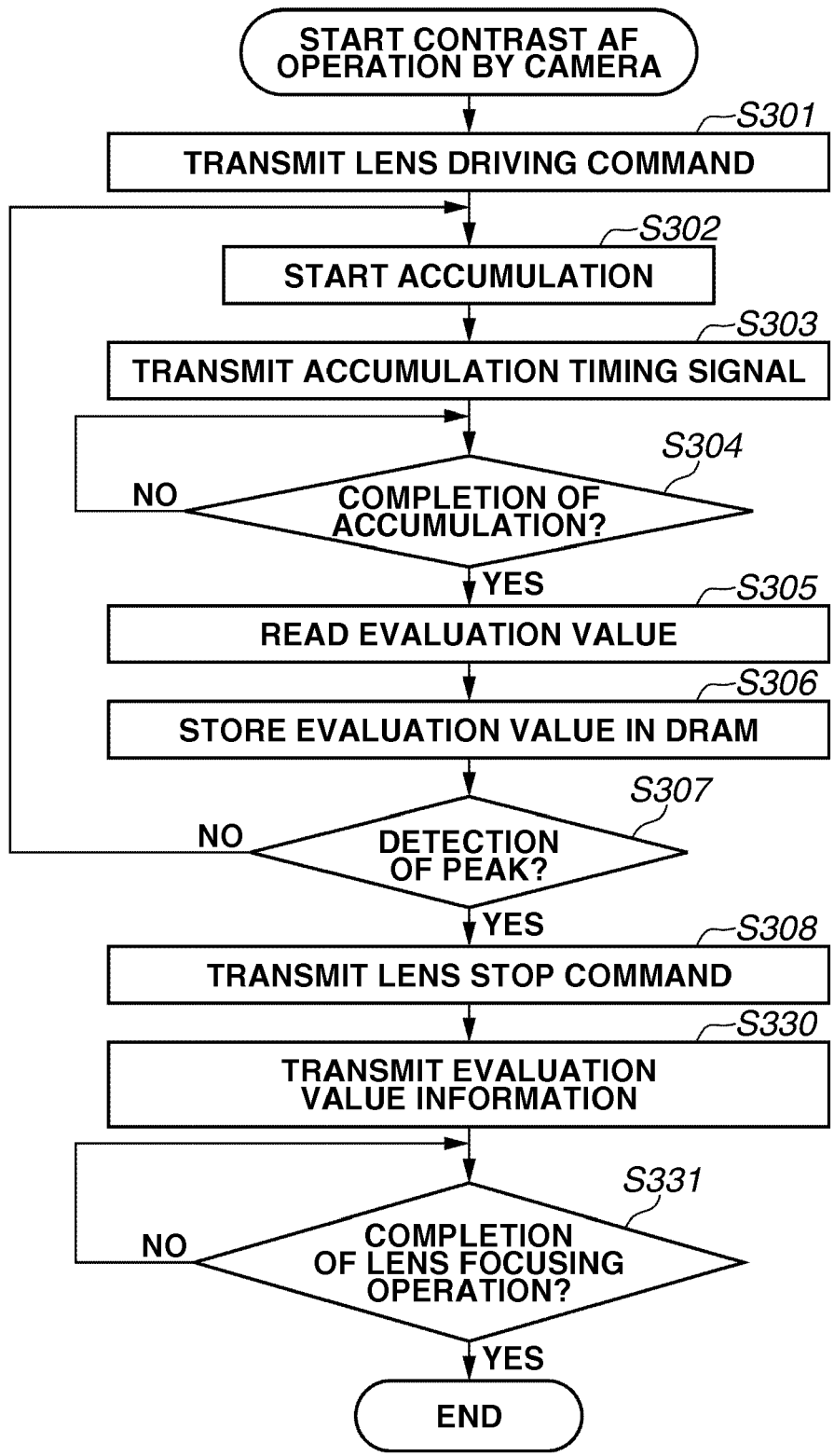
FIG. 17 is a flowchart illustrating an example operation performed by a system controller in the contrast AF control operation according to a fourth exemplary embodiment of the present invention.

FIG. 17 is a flowchart illustrating an example operation performed by the system controller 230 of the digital camera 200 in the contrast AF control operation according to the fourth exemplary embodiment, which corresponds to the operation described in the first exemplary embodiment with reference to FIG. 8.

In the fourth exemplary embodiment, the system controller 230 performs sequential operations similar to those described in the first exemplary embodiment (see FIG. 8) to detect a peak (step S307) and to transmit a lens stop command (step S308).

In step S330, the system controller 230 transmits the contrast evaluation value stored in the DRAM 229 to the photographic lens 100 via the communication terminal provided in the electric contact unit 107.

Then, the processing proceeds to step S331, in which the system controller 230 waits for a focusing operation termination notification to be transmitted from the photographic lens 100. If the focusing operation termination notification is received from the photographic lens 100 (YES in step S331), the system controller 230 terminates the contrast AF control operation for the digital camera 200. An example operation performed by the photographic lens 100 is described below.

Figure 18:
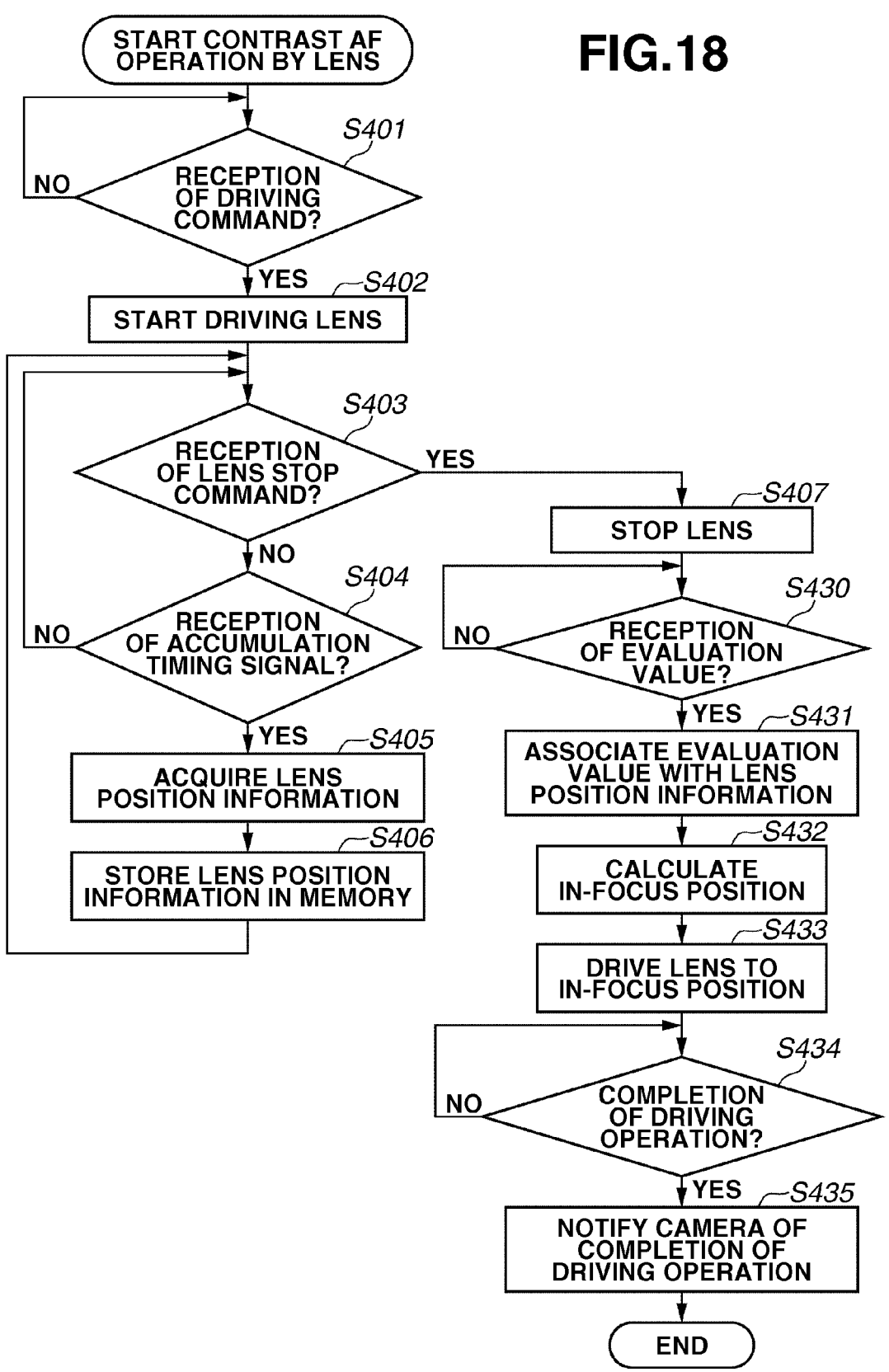
FIG. 18 is a flowchart illustrating an example operation performed by a lens controller in the contrast AF control operation according to the fourth exemplary embodiment of the present invention.

FIG. 18 is a flowchart illustrating an example operation performed by the lens controller 108 of the photographic lens 100 in the contrast AF control operation according to the fourth exemplary embodiment, which corresponds to the operation described in the first exemplary embodiment with reference to FIG. 9.

The lens controller 108 performs sequential operations similar to those described in the first exemplary embodiment (see FIG. 9) to stop the focusing lens 101 (step S407).

In step S430, the lens controller 108 waits for a contrast evaluation value to be transmitted from the digital camera 200. More specifically, if the system controller 230 of the digital camera 200 transmits a contrast evaluation value (step S330), the lens controller 108 receives the contrast evaluation value. The processing then proceeds to step S431.

In step S431, the lens controller 108 associates the contrast evaluation value transmitted from the digital camera 200 with the lens position information stored in the memory 109 with reference to ID information attached thereto.

Then, the processing proceeds to step S432, in which the lens controller 108 calculates an in-focus position as a lens position where the contrast evaluation value is maximized based on the lens position information and the contrast evaluation value associated with each other.

Then, the processing proceeds to step S433, in which the lens controller 108 controls the lens driving mechanism 103 via the lens driving control circuit 104, which causes the focusing lens 101 to move to the in-focus position calculated in step S432.

In step S434, the lens controller 108 waits for completion of the lens driving operation. If the lens driving operation has been completed (YES in step S434), the processing proceeds to step S435. In step S435, the lens controller 108 notifies the digital camera 200 of the completion of the lens driving operation. Then, the lens controller 108 terminates the contrast AF control operation for the photographic lens 100.

As described above, according to the fourth exemplary embodiment, the photographic lens 100 can calculate the in-focus point. As a result, the photographic lens 100 can achieve a high-speed and high-accuracy contrast AF operation, even though a back-lash removing control method is different depending on each interchangeable lens due to the difference of a driving motor or a driving system.

According to the first to fourth exemplary embodiments, the lens controller 108 performs communication with the system controller 230 to transmit lens position information or receive contrast evaluation values when the focusing lens 101 is stopped.

A fifth exemplary embodiment is different from the first to fourth exemplary embodiments in that the lens controller 108 performs communication with the system controller 230 to transmit lens position information if the processing load is low even when the lens controller 108 is performing a lens driving operation. An imaging system according to the fifth exemplary embodiment is described with reference to FIGS. 19 to 21.

Figure 19:
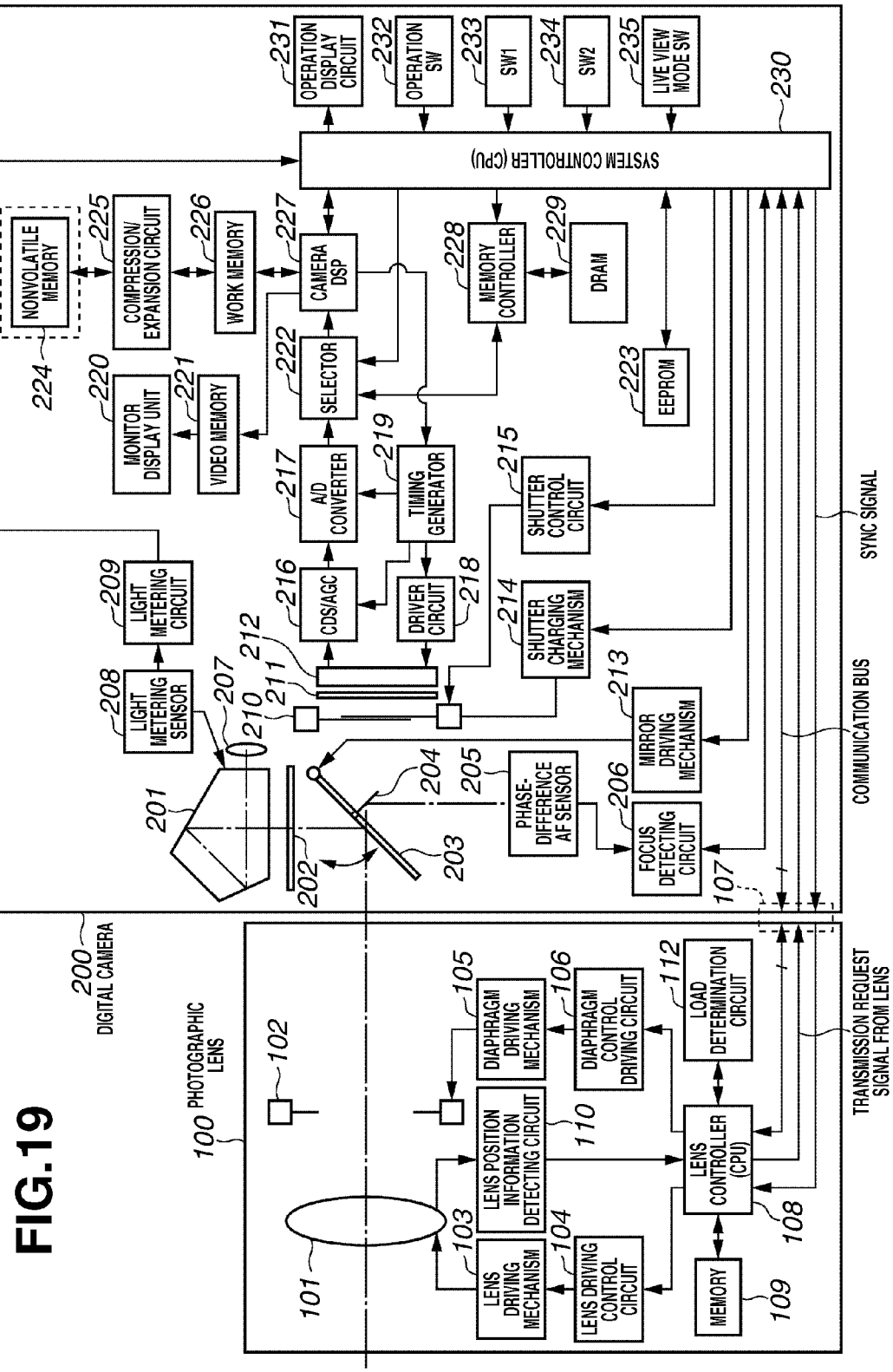
FIG. 19 is a block diagram illustrating an example arrangement of a digital camera including an automatic focusing apparatus according to a fifth exemplary embodiment of the present invention.

FIG. 19 is a block diagram illustrating an example arrangement of a digital camera including an automatic focusing apparatus according to the fifth exemplary embodiment.

The imaging system illustrated in FIG. 19 is different from the imaging system illustrated in FIG. 1 in that the lens controller 108 is connected to a load determination circuit 112 configured to check the processing load of the lens controller 108 and a transmission request signal line is provided in the electric contact unit 107. Thus, the lens controller 108 can transmit a data transmission request to the digital camera 200 via the transmission request signal line.

For example, the load determination circuit 112 monitors the CPU utilization of the lens controller 108 to determine the processing load of the lens controller 108. Example operations in the contrast AF control operation according to the fifth exemplary embodiment are described below with reference to FIGS. 20 and 21.

Figure 20:
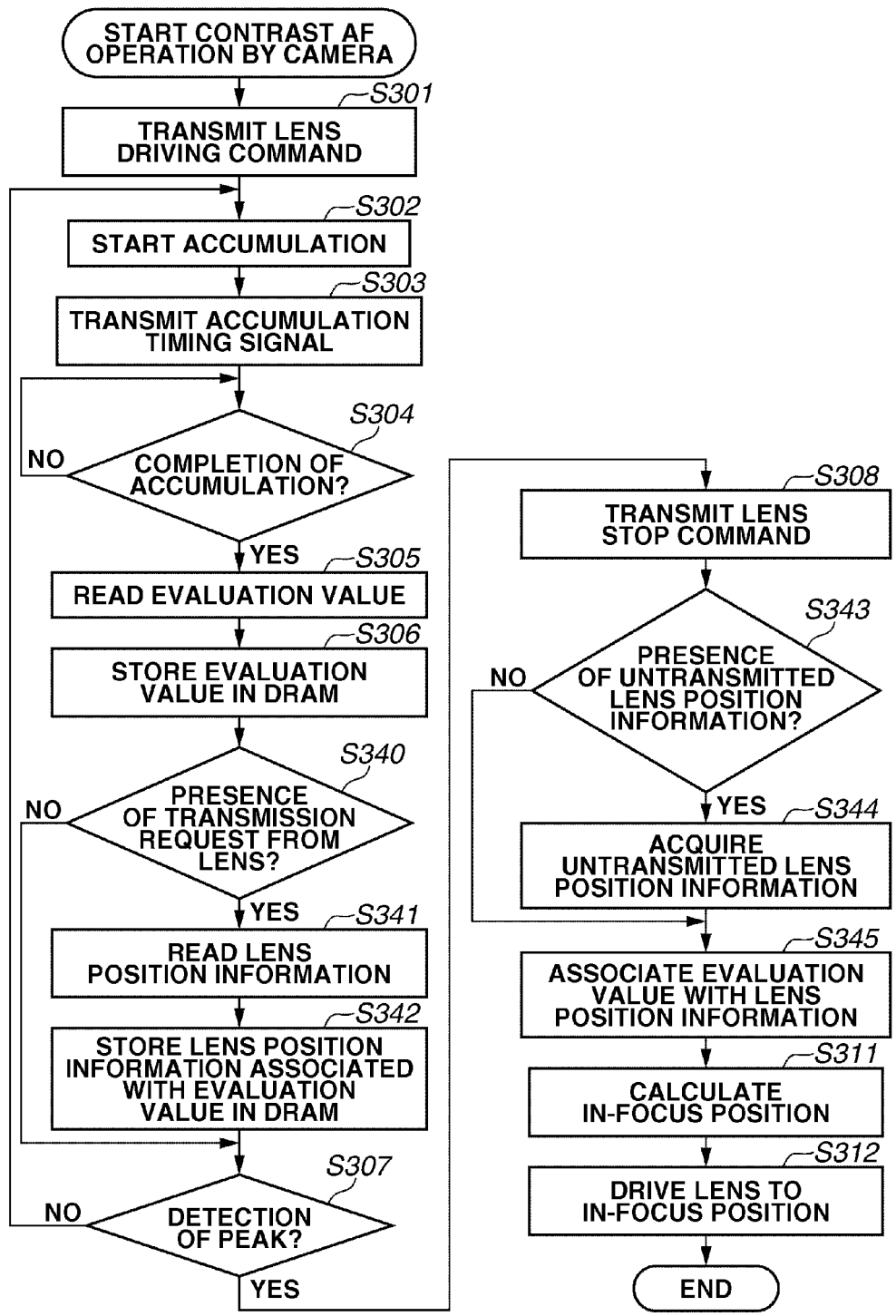
FIG. 20 is a flowchart illustrating an example operation performed by a system controller in the contrast AF control operation according to the fifth exemplary embodiment of the present invention.

FIG. 20 is a flowchart illustrating an example operation performed by the system controller 230 of the digital camera 200 in the contrast AF control operation according to the fifth exemplary embodiment, which corresponds to the operation described in the first exemplary embodiment with reference to FIG. 8.

In the fifth exemplary embodiment, the system controller 230 performs sequential operations similar to those described in the first exemplary embodiment (see FIG. 8) from step S301 (transmit a lens driving command) to step S306 (store a contrast evaluation value in the DRAM 229).

Then, the processing proceeds to step S340, in which the system controller 230 checks the transmission request signal line to determine whether there is any transmission request from the photographic lens 100.

If the transmission request is present (YES in step S340), the processing proceeds to step S341. In step S341, the system controller 230 reads lens position information transmitted from the photographic lens 100.

In step S342, the system controller 230 associates the received lens position information with the contrast evaluation value information stored therein and stores the associated data in the DRAM 229. Then, the processing proceeds to step S307, in which the system controller 230 checks the presence of any peak in the evaluation value.

If the transmission request is not present (NO in step S340), the processing proceeds to step S307.

If a peak of the evaluation value is detected (YES in step S307), the system controller 230 transmits a lens stop command to the photographic lens 100 (step S308).

Then, the processing proceeds to step S343, in which the system controller 230 checks the presence of lens position information that is not yet transmitted from the photographic lens 100. If there is not any untransmitted lens position information (NO in step S343), the processing proceeds to step S345. If untransmitted lens position information is present (YES in step S343), the processing proceeds to step S344. In step S344, the system controller 230 acquires the untransmitted lens position information from the photographic lens 100. Then, the processing proceeds to step S345.

In step S345, the system controller 230 associates the contrast evaluation value stored in the DRAM 229 with the lens position information transmitted from the photographic lens 100.

Then, the system controller 230 calculates an in-focus position (step S311) and transmits a lens driving command to the photographic lens 100 (step S312), thereby causing the lens driving mechanism 103 to move the focusing lens 101 to the calculated in-focus position. Then, the system controller 230 terminates the contrast AF control operation for the digital camera 200. An example operation performed by the photographic lens 100 is described below.

Figure 21:
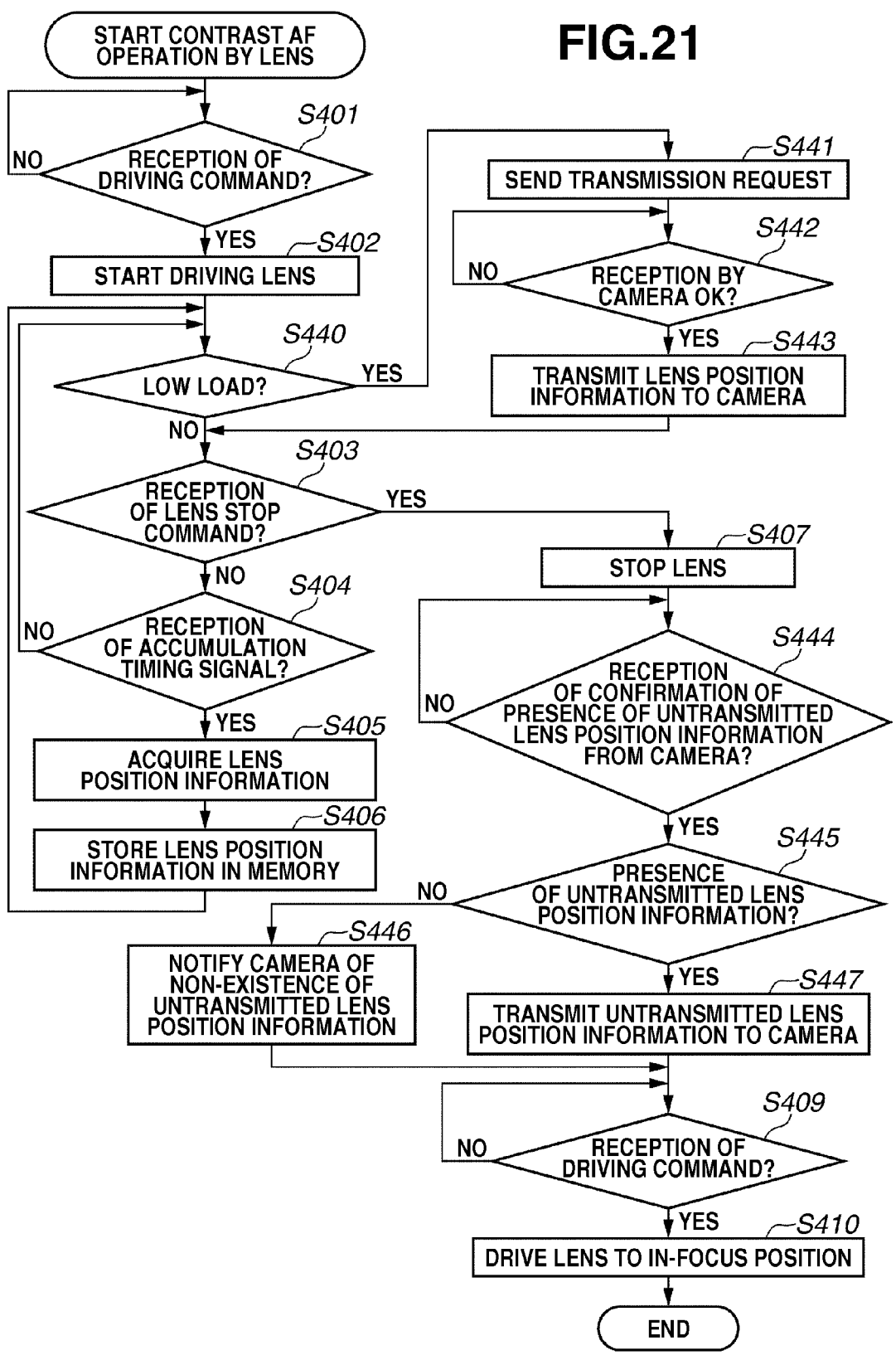
FIG. 21 is a flowchart illustrating an example operation performed by a lens controller in the contrast AF control operation according to the fifth exemplary embodiment of the present invention.

FIG. 21 is a flowchart illustrating an example operation performed by the lens controller 108 of the photographic lens 100 in the contrast AF control operation according to the fifth exemplary embodiment, which corresponds to the operation described in the first exemplary embodiment with reference to FIG. 9.

In step S401, the lens controller 108 waits for the lens driving command to be transmitted from the digital camera 200. If the lens driving command is received (YES in step S401), the lens controller 108 starts a lens driving operation (step S402).

Then, the processing proceeds to step S440, in which the lens controller 108 causes the load determination circuit 112 to check the processing load of the lens controller 108.

If the processing load is high (NO in step S440), the processing proceeds to step S403. In step S403, the lens controller 108 determines whether the lens stop command is received. If the processing load is low (YES in step S440), the processing proceeds to step S441. In step S441, the lens controller 108 sends a transmission request to the digital camera 200 via the transmission request signal line. Then, the processing proceeds to step S442, in which the lens controller 108 determines whether the digital camera 200 is ready to receive the transmission request.

If the digital camera 200 is ready to receive the transmission request (YES in step S442), the processing proceeds to step S443. In step S443, the lens controller 108 transmits lens position information to the digital camera 200. Then, the processing proceeds to step S403.

The lens controller 108 performs sequential operations similar to those described in the first exemplary embodiment (see FIG. 9) from step S403 to step S407 (stop the focusing lens 101).

After the focusing lens 101 is stopped, the processing proceeds to step S444. In step S444, the lens controller 108 checks reception of confirmation of the presence of untransmitted lens position information from the digital camera 200.

If the confirmation is received (YES in step S444), the processing proceeds to step S445. In step S445, the lens controller 108 checks the presence of untransmitted lens position information.

If there is not any untransmitted lens position information (NO in step S445) the processing proceeds to step S446. In step S446, the lens controller 108 notifies the digital camera 200 of non-existence of untransmitted lens position information. Then, the processing proceeds to step S409.

If untransmitted lens position information is present (YES in step S445), the processing proceeds to step S447. In step S447, the lens controller 108 transmits the untransmitted lens position information to the digital camera 200. Then, the processing proceeds to step S409.

In step S409, the lens controller 108 waits for the lens driving command to be transmitted from the digital camera 200. If the lens driving command is received (YES in step S409), the processing proceeds to step S410. In step S410, the lens controller 108 causes the lens driving mechanism 103 to drive the focusing lens 101 to the in-focus position. Then, the lens controller 108 terminates the contrast AF control operation for the photographic lens 100.

As described above, according to the fifth exemplary embodiment, the lens controller 108 performs communication with the system controller 230 when the processing load is low. Therefore, the fifth exemplary embodiment can reduce the amount of communications performed after completing the peak detection processing and the lens stopping processing. The final lens driving operation can be performed speedily.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-306001 filed Nov. 27, 2007, which is hereby incorporated by reference herein in its entirety.

What is claimed is:

1. An imaging apparatus adapted to receive a detachable lens unit, the lens unit including a lens control unit; a lens driving unit that moves a lens to change a focus position; a lens position information detecting circuit that detects position information of the lens; and a first memory that stores position information of the lens; the imaging apparatus comprising:
    a communication unit configured to communicate with the lens unit;
    a contrast detection unit configured to acquire an evaluation value corresponding to a contrast of an object image based on a signal output from an image sensor according to light having passed through the lens;
    a second memory configured to store a plurality of evaluation values acquired by the contrast detection unit at respective different timings; and
    a controller configured to control a focus position of the lens by causing the communication unit to acquire a plurality of lens position information stored in the first memory,
    wherein, when the lens is moving due to focusing and the lens control unit is performing acceleration/deceleration processing, lens position information is stored in the first memory without being communicated to the imaging apparatus without synchronization with respect to acquisition of the evaluation value by the contrast detection unit, and without associating the acquired plurality of lens position information with the evaluation values stored in the second memory.

2. The imaging apparatus according to claim 1, wherein the controller causes the communication unit to acquire the plurality of lens position information stored in the first memory when a processing load of the lens control unit is low as a result of the lens control unit not performing acceleration/deceleration processing.

3. The imaging apparatus according to claim 1, wherein the controller causes the communication unit to acquire the plurality of lens position information stored in the first memory when the lens is stopped.

4. The imaging apparatus according to claim 1, wherein the first memory stores the position information of the lens in association with accumulation timing of the object image transmitted from the imaging unit.

5. An imaging apparatus adapted to receive a detachable lens unit, the lens unit including a lens control unit; a lens driving unit that moves a lens to change a focus position; a lens position information detecting circuit that detects position information of the lens; and a first memory that stores position information of the lens; the imaging apparatus comprising:
   a communication unit configured to communicate with the lens unit;
   a contrast detection unit configured to acquire an evaluation value corresponding to a contrast of an object image based on a signal output from an image sensor according to light passing through the lens;
   a second storage unit configured to store a plurality of evaluation values acquired by the contrast detection unit at respective different timings; and
   a control unit configured to control a focus position of the lens by causing the communication unit to acquire a plurality of lens position information stored in the first storage unit when a processing load of the lens control unit is low, as a result of the lens control unit not performing acceleration/deceleration processing, and associating the acquired plurality of lens position information with the evaluation values stored in the second storage unit.

6. A lens unit adapted to be mounted to an imaging apparatus, the imaging apparatus including a contrast detection unit configured to acquire an evaluation value corresponding to a contrast of an object image based on a signal output from an image sensor, the lens unit comprising:
   a communication unit configured to communicate with the imaging apparatus;
   a lens driving unit configured to move a lens to change a focus position;
   a lens position information detecting circuit that detects position information of the lens;
   a storage unit configured to store position information of the lens; and
   a lens control unit configured to cause the communication unit to transmit a plurality of lens position information stored in the storage unit to the imaging apparatus, when the lens is not moving due to focusing and when the lens control unit is not performing acceleration/deceleration processing, without synchronization with respect to acquisition of the evaluation value by the contrast detection unit of the imaging apparatus.

7. A lens unit adapted to be mounted to an imaging apparatus, the imaging apparatus including a contrast detection unit configured to acquire an evaluation value corresponding to a contrast of an object image based on a signal output from an image sensor, the lens unit comprising:
   a communication unit configured to communicate with the imaging apparatus;
   a lens driving unit configured to move a lens to change a focus position;
   a lens position information detecting circuit that detects position information of the lens;
   a storage unit configured to store position information of the lens; and
   a lens control unit configured to cause the communication unit to transmit a plurality of lens position information stored in the storage unit to the imaging apparatus when a processing load of the lens control unit is low as a result of the lens control unit not performing acceleration/deceleration processing.

8. A lens unit adapted to be mounted to an imaging apparatus, the imaging apparatus including a contrast detection unit configured to acquire an evaluation value corresponding to a contrast of an object image based on a signal output from an image sensor, the lens unit comprising:
   a communication unit configured to communicate with the imaging apparatus;
   a lens driving unit configured to move a lens to change a focus position;
   a lens position information detecting circuit that detects position information of the lens;
   a storage unit configured to store position information of the lens in synchronization with acquisition of the object image; and
   a control unit configured to cause the communication unit to transmit a plurality of lens position information, stored in the storage unit in association with acquisition timing of the object image, to the imaging apparatus.

9. An imaging system comprising an imaging apparatus and a detachable lens unit mountably attached to the imaging apparatus,
   the lens unit including:
      a lens control unit;
      a lens driving unit that moves a lens to change a focus position;
      a lens position information detecting circuit that detects position information of the lens; and
      a first memory that stores position information of the lens;
   the imaging apparatus including:
      a communication unit configured to communicate with the lens unit;
      a contrast detection unit configured to acquire an evaluation value corresponding to a contrast of an object image based on a signal output from an image sensor according to light having passed through the lens;
      a second memory configured to store a plurality of evaluation values acquired by the contrast detection unit at respective different timings; and
      a controller configured to control a focus position of the lens by causing the communication unit to acquire a plurality of lens position information stored in the first memory,
   wherein when the lens is moving due to focusing and the lens control unit is performing acceleration/deceleration processing, lens position information is stored in the first memory without being communicated to the imaging apparatus, without synchronization with respect to acquisition of the evaluation value by the contrast detection unit, and without associating the acquired plurality of lens position information with the evaluation values stored in the second memory.

10. A method for controlling an imaging system comprising an imaging apparatus and a detachable lens unit mountably attached to the imaging apparatus, the lens unit including:
   a lens control unit;
   a lens driving unit that moves a lens to change a focus position;
   a lens position information detecting circuit that detects position information of the lens; and
   a first memory that stores position information of the lens;

the imaging apparatus including:
   a communication unit configured to communicate with the lens unit;
   a contrast detection unit configured to acquire an evaluation value corresponding to a contrast of an object image based on a signal output from an image sensor according to light having passed through the lens;
   a second memory configured to store a plurality of evaluation values acquired by the contrast detection unit at respective different timings; and
   a controller configured to control a focus position of the lens by causing the communication unit to acquire a plurality of lens position information stored in the first memory;

the method comprising:
   when the lens is moving due to focusing and the lens control unit is performing acceleration/deceleration processing, storing positioning information in the first memory,
   without communicating to the imaging apparatus,
   without synchronization with respect to acquisition of the evaluation value by the contrast detection unit, and
   without associating the acquired plurality of lens position information with the evaluation values stored in the second memory.

11. The method to claim 10, further comprising controlling the controller to cause the communication unit to acquire the plurality of lens position information stored in the first memory when a processing load of the lens control unit is low as a result of the lens control unit not performing acceleration/deceleration processing.

12. The method according to claim 10, further comprising controlling the controller to cause the communication unit to acquire the plurality of lens position information stored in the first memory when the lens is stopped.

13. The imaging apparatus according to claim 10, further comprising storing the position information of the lens in association with accumulation timing of the object image transmitted from the imaging unit in the first memory.

* * * * *